US012687277B2

(12) United States Patent
Koito et al.

(10) Patent No.: US 12,687,277 B2
(45) Date of Patent: Jul. 21, 2026

(54) LIGHTING SYSTEM

(71) Applicant: Japan Display Inc., Tokyo (JP)

(72) Inventors: Takeo Koito, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 31 days.

(21) Appl. No.: 19/047,977

(22) Filed: Feb. 7, 2025

(65) Prior Publication Data

US 2025/0180187 A1     Jun. 5, 2025

Related U.S. Application Data

(63) Continuation of application No. PCT/JP2023/027922, filed on Jul. 31, 2023.

(30) Foreign Application Priority Data

Sep. 5, 2022     (JP) ................................. 2022-140638

(51) Int. Cl.
G02F 1/13          (2006.01)
F21V 14/00          (2018.01)
(Continued)

(52) U.S. Cl.
CPC .......... F21V 14/003 (2013.01); G02F 1/1323 (2013.01); G02F 1/13306 (2013.01);
(Continued)

(58) Field of Classification Search
CPC ...... H05B 45/10; H05B 47/10; H05B 47/105; H05B 47/17; H05B 47/19; H05B 47/196;
(Continued)

(56) References Cited

U.S. PATENT DOCUMENTS 12,565,980 B2 * 3/2026 Saito ..................... F21V 14/003
2007/0030240 A1 * 2/2007 Sumiyoshi ........ G02F 1/133605
345/102

(Continued)

FOREIGN PATENT DOCUMENTS

JP          2012-069409 A     4/2012

OTHER PUBLICATIONS

Search report issued in related International Patent Application No. PCT/JP2023/027922, mailed Sep. 26, 2023 and English translation of same. 5 pages.

*Primary Examiner* — Thai Pham
(74) *Attorney, Agent, or Firm* — K&L Gates LLP

(57)          ABSTRACT

A lighting system includes a light source, a liquid crystal cell for changing a light distribution angle of light emitted from the light source, and a control device for controlling a gradation of the light distribution angle. The control device includes a communication portion for receiving gradation information of the light distribution angle from an information communication terminal, a storage section for storing a weighting coefficient that associates a change in the light distribution angle with a change in the gradation of the light distribution angle, and a control section for calculating first to fourth voltages to be input to first to fourth transparent electrodes of the liquid crystal cell, based on the gradation information and the weighting coefficient.

6 Claims, 22 Drawing Sheets

(51) Int. Cl.

| | |
|---|---|
| *G02F 1/133* | (2006.01) |
| *G02F 1/1347* | (2006.01) |
| *G02F 1/139* | (2006.01) |
| *H05B 47/10* | (2020.01) |
| *H05B 47/17* | (2020.01) |
| *H05B 47/175* | (2020.01) |

(52) U.S. Cl.

CPC ........ *G02F 1/13471* (2013.01); *G02F 1/1396* (2013.01); *H05B 47/17* (2020.01); *H05B 47/196* (2024.01)

(58) Field of Classification Search

CPC .......... F21V 14/00; F21V 14/003; F21V 9/40; G02F 1/13; G02F 1/133; G02F 1/13306; G02F 1/1323; G02F 1/1343; G02F 1/1347; G02F 1/13471; G02F 1/1396

See application file for complete search history.

(56) References Cited

U.S. PATENT DOCUMENTS

| | | | | |
|---|---|---|---|---|
| 2007/0058108 A1* | 3/2007 | Uehara | ................ | G02B 6/0076 |
| | | | | 349/86 |
| 2017/0130945 A1 | 5/2017 | Kitano et al. | | |
| 2024/0295305 A1* | 9/2024 | Takahata | ............. | F21V 23/0471 |
| 2024/0392934 A1* | 11/2024 | Ikeda | ........................ | F21K 9/65 |

* cited by examiner time

LIGHTING SYSTEM

CROSS-REFERENCE TO RELATED APPLICATIONS

This application is a Continuation of International Patent Application No. PCT/JP2023/027922, filed on Jul. 31, 2023, which claims the benefit of priority to Japanese Patent Application No. 2022-140638, filed on Sep. 5, 2022, the entire contents of which are incorporated herein by reference.

FIELD

An embodiment of the present invention relates to a lighting system that uses a liquid crystal to control a light distribution angle of light emitted from a light source.

BACKGROUND

A method for adjusting the lens position by combining lenses or a method for adjusting the focal position by a motor have been proposed for controlling a light distribution of a lighting device (for example, see Japanese laid-open patent publication No. 2016-39026). On the other hand, in recent years, a lighting device using an optical element which is a so-called liquid crystal lens has been developed in which a change in the refractive index of a liquid crystal is utilized by adjusting a voltage applied to the liquid crystal (for example, see Japanese laid-open patent publication No. 2012-69409).

SUMMARY

A lighting system includes a light source, a liquid crystal cell for changing a light distribution angle of light emitted from the light source, and a control device for controlling a gradation of the light distribution angle. The liquid crystal cell includes a first substrate on which a first transparent electrode and a second transparent electrode each extending in a first direction are alternately provided, a second substrate on which a third transparent electrode and a fourth transparent electrode each extending in a second direction orthogonal to the first direction are alternately provided, and a liquid crystal layer between the first substrate and the second substrate. The control device includes a communication portion for receiving gradation information of the light distribution angle from an information communication terminal, a storage section for storing a weighting coefficient that associates a change in the light distribution angle with a change in the gradation of the light distribution angle, and a control section for calculating a first voltage to be input to the first transparent electrode, a second voltage to be input to the second transparent electrode, a third voltage to be input to the third transparent electrode, and a fourth voltage to be input to the fourth transparent electrode based on the gradation information and the weighting coefficient.

BRIEF DESCRIPTION OF DRAWINGS

FIG. 12A is a graph showing a correlation between a gradation level and a half width at half maximum when a weighting coefficient b=3 in a lighting system according to an embodiment of the present invention.

Figure 12A:
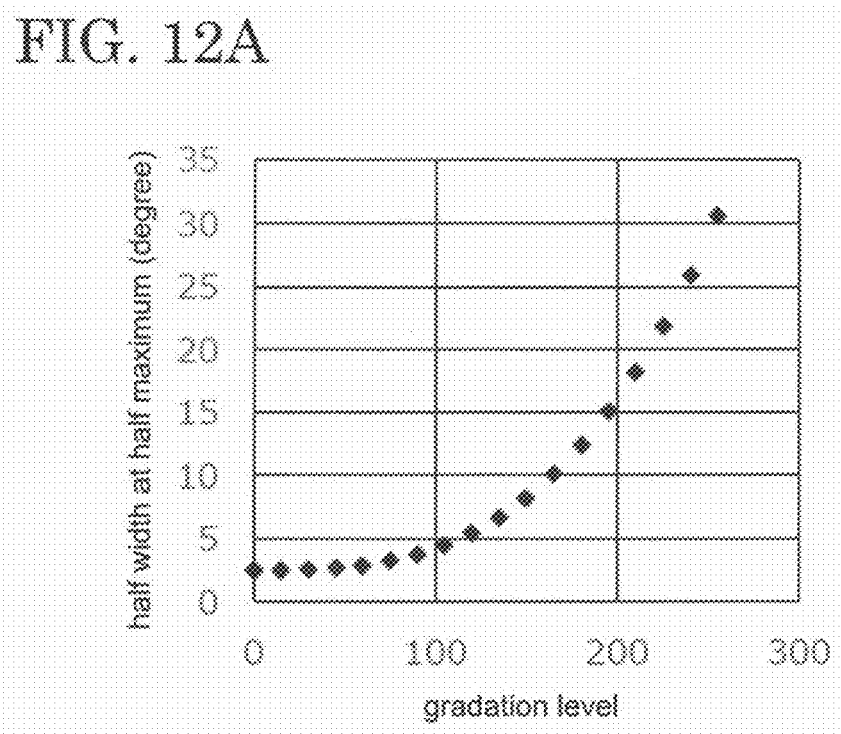
Figure 12B:
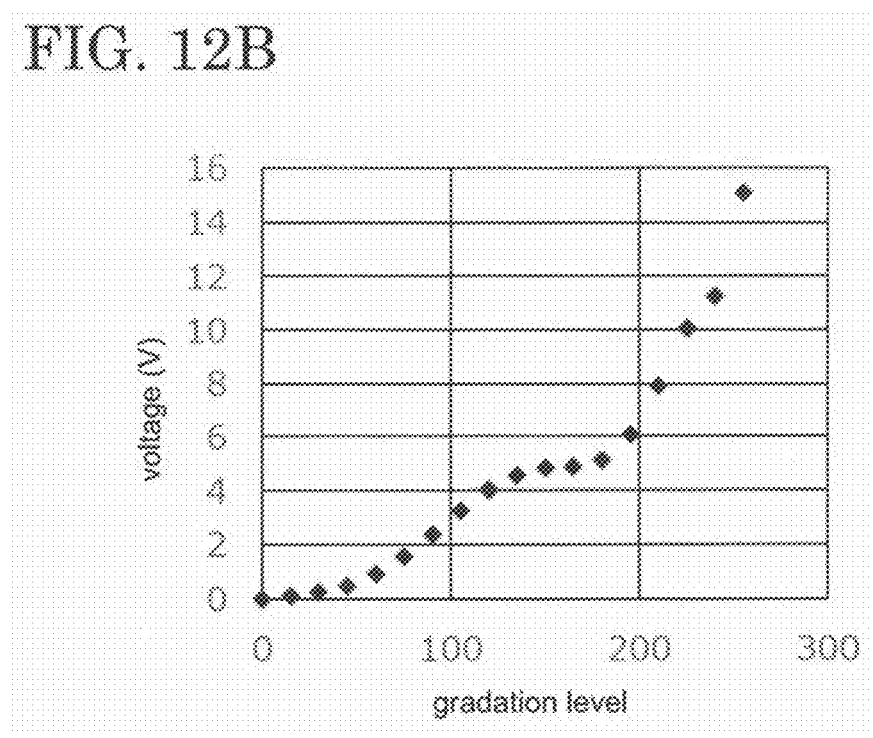

FIG. 12B is a graph showing a correlation between a gradation level and a voltage applied to a transparent electrode when a weighting coefficient b=3 in a lighting system according to an embodiment of the present invention.

Figure 13:
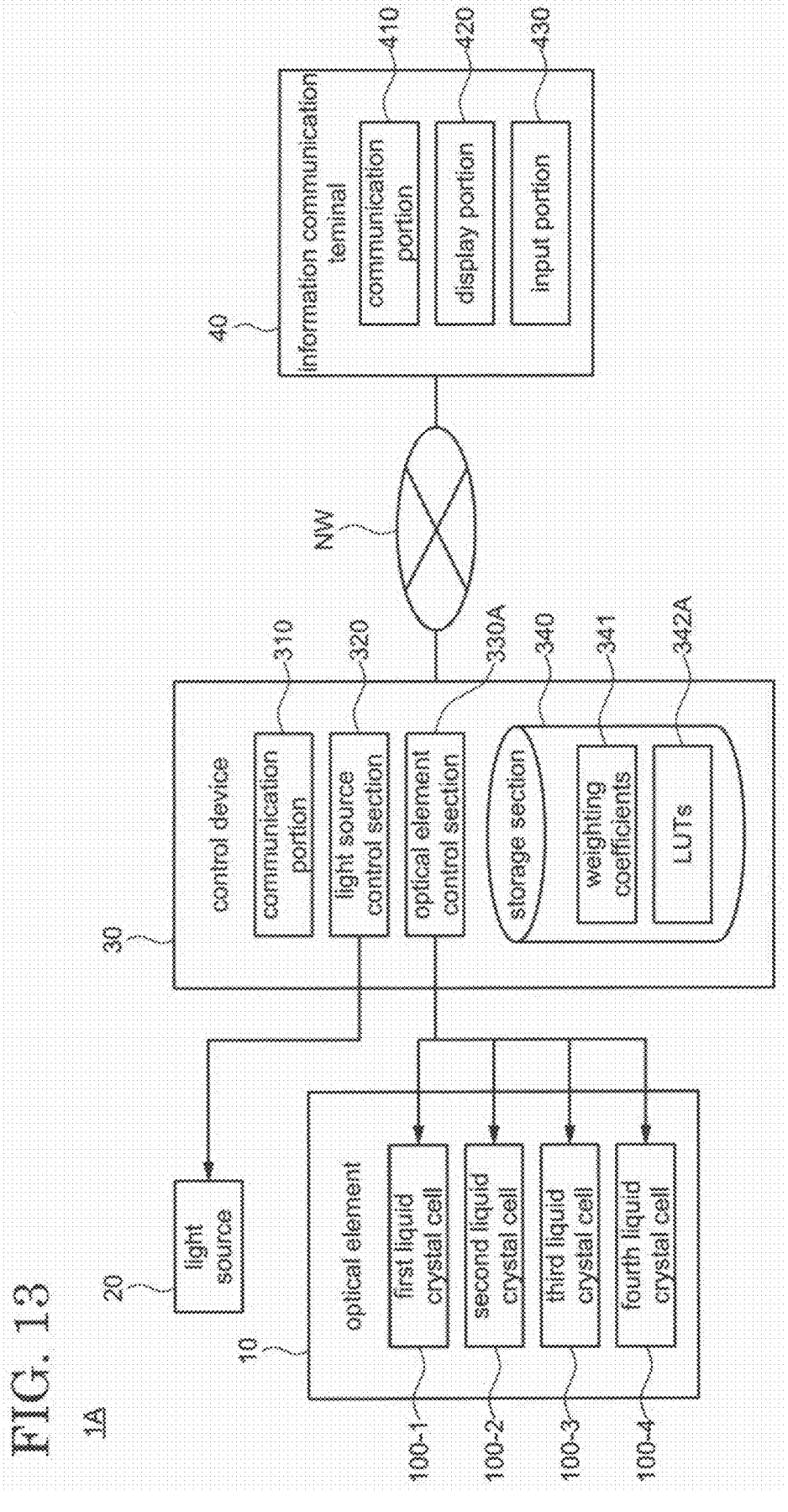

FIG. 13 is a block diagram illustrating a lighting system according to an embodiment of the present invention.

Figure 14:
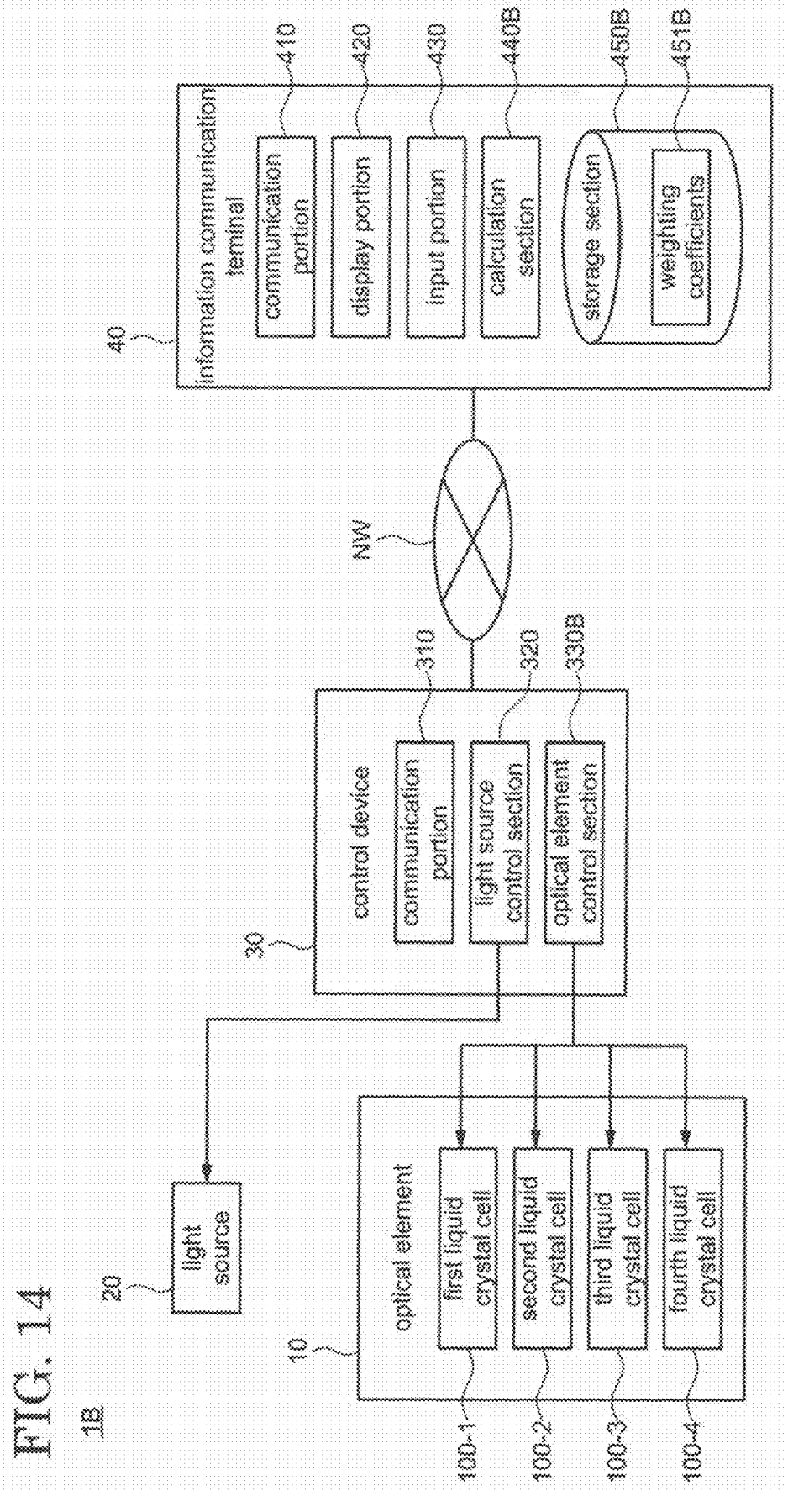

FIG. 14 is a block diagram illustrating a lighting system according to an embodiment of the present invention.

DESCRIPTION OF EMBODIMENTS

In a lighting device using a liquid crystal lens, a light distribution is controlled by a voltage applied to a liquid crystal. However, since a change in a refractive index of the liquid crystal with respect to the voltage is not constant, it is difficult to control the light distribution, therefore, there is a problem that the light distribution does not match a user's operating feeling.

In view of the above problem, an embodiment of the present invention can provide a lighting system that enables control of a light distribution to match a user's operational feeling.

In the following description, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via yet another structure over a certain structure, are both included.

First Embodiment

A lighting system 1 according to an embodiment of the present invention is described with reference to FIGS. 1 to 12B.

[1. Configuration of Lighting System 1]

Figure 1:
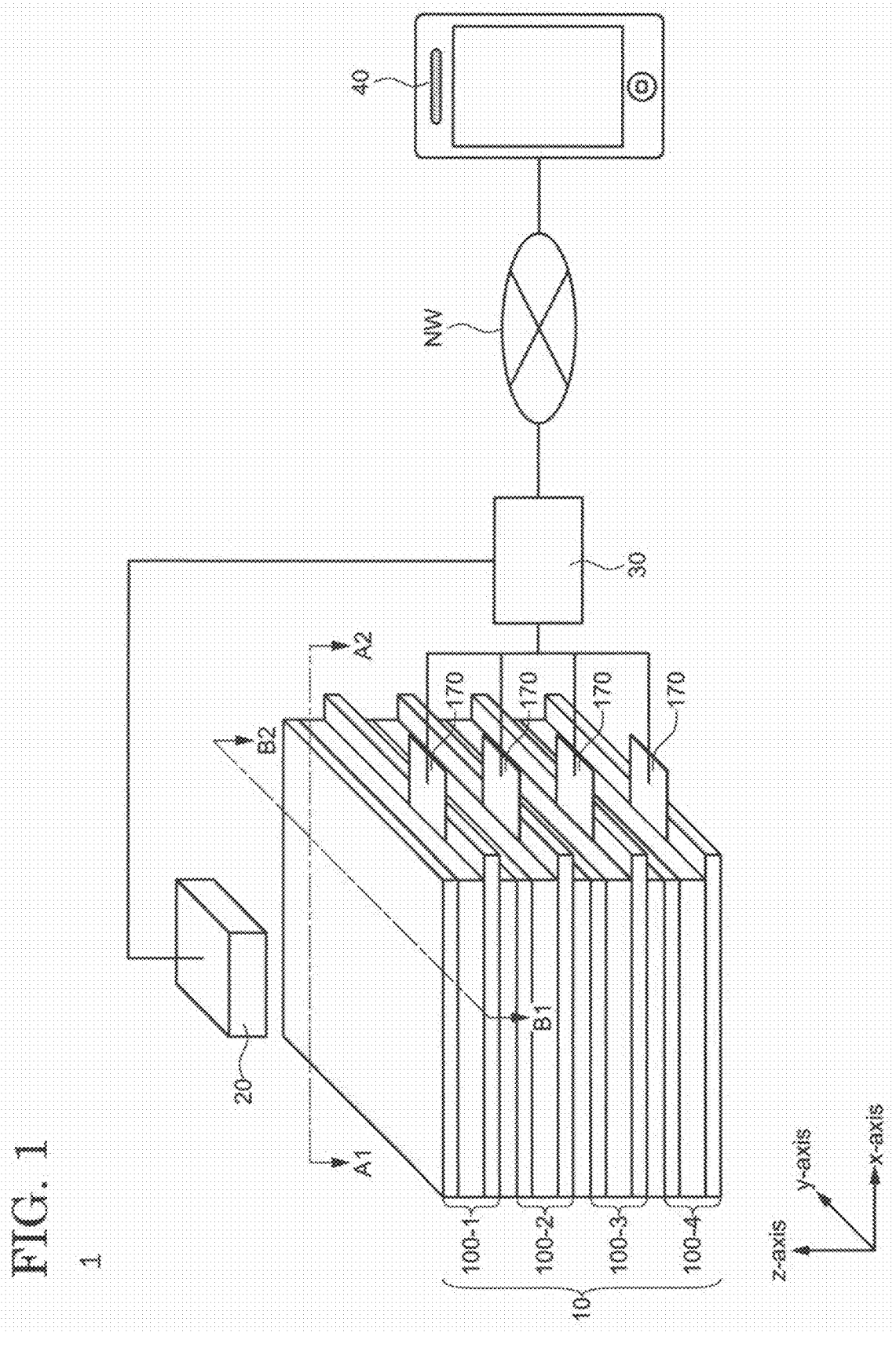
FIG. 1 is a schematic diagram showing a configuration of a lighting system according to an embodiment of the present invention.

FIG. 1 is a schematic diagram showing a configuration of the lighting system 1 according to an embodiment of the present invention. As shown in FIG. 1, the lighting system 1 includes an optical element 10, a light source 20, a control device 30, and an information communication terminal 40.

The optical element 10 includes four liquid crystal cells 100 (a first liquid crystal cell 100-1, a second liquid crystal cell 100-2, a third liquid crystal cell 100-3, and a fourth liquid crystal cell 100-4). In the optical element 10, the first liquid crystal cell 100-1, the second liquid crystal cell 100-2, the third liquid crystal cell 100-3, and the fourth liquid crystal cell 100-4 are stacked in a z-axis direction in order from the side closer to the light source 20. In addition, although a configuration in which the optical element 10 includes four liquid crystal cells 100 is described later, the number of liquid crystal cells 100 included in the optical element 10 is not limited to four. It is sufficient that the optical element 10 includes at least two liquid crystal cells 100. The details of the configuration of the optical element 10 is described later.

The light source 20 emits light to the optical element 10. The light emitted from the light source 20 is incident on the first liquid crystal cell 100-1 and is extracted from the fourth liquid crystal cell 100-4. In the lighting system 1, the diffusion and polarization of the light are controlled by the four liquid crystal cells 100 included in the optical element 10, and the spread (light distribution) of the light extracted from the fourth liquid crystal cell 100-4 can be changed. For example, although light emitting diodes (LEDs) can be used as the light source 20, the light source 20 is not limited thereto. The light source 20 may be any element or device that can emit light.

The control device 30 is connected to the optical element 10 and the light source 20 to control the optical element 10 and the light source 20. The control device 30 includes, for example, a central processing unit (CPU), a microprocessor (MPU), an integrated circuit (IC), an application specific integrated circuit (ASIC), a field-programmable gate array (FPGA), or a random access memory (RAM). The configuration of the control device 30 is described in detail later.

Although the information communication terminal 40 is a mobile phone, a smartphone, a tablet, or a personal computer, for example, the information communication terminal 40 is not limited thereto. The information communication terminal 40 is communicably connected to the control device 30 via a network NW. The network NW may be wired or wireless. However, when the information communication terminal 40 is a mobile terminal, it is preferable that the network NW is wireless. Although the network NW is, for example, a LAN (Local Area Network) or the Internet, the network NW is not limited thereto. The network NW may also be a network via a communication base station managed by a communication company. The configuration of the information communication terminal 40 will be described in detail later.

A user can use the information communication terminal 40 to set a light distribution of the light emitted from the light source 20. That is, in the lighting system 1, the control device 30 can control the optical element 10 and the light source 20 based on user input information from the information communication terminal 40 to change the light distribution of the light emitted from the light source 20.

Figure 2:
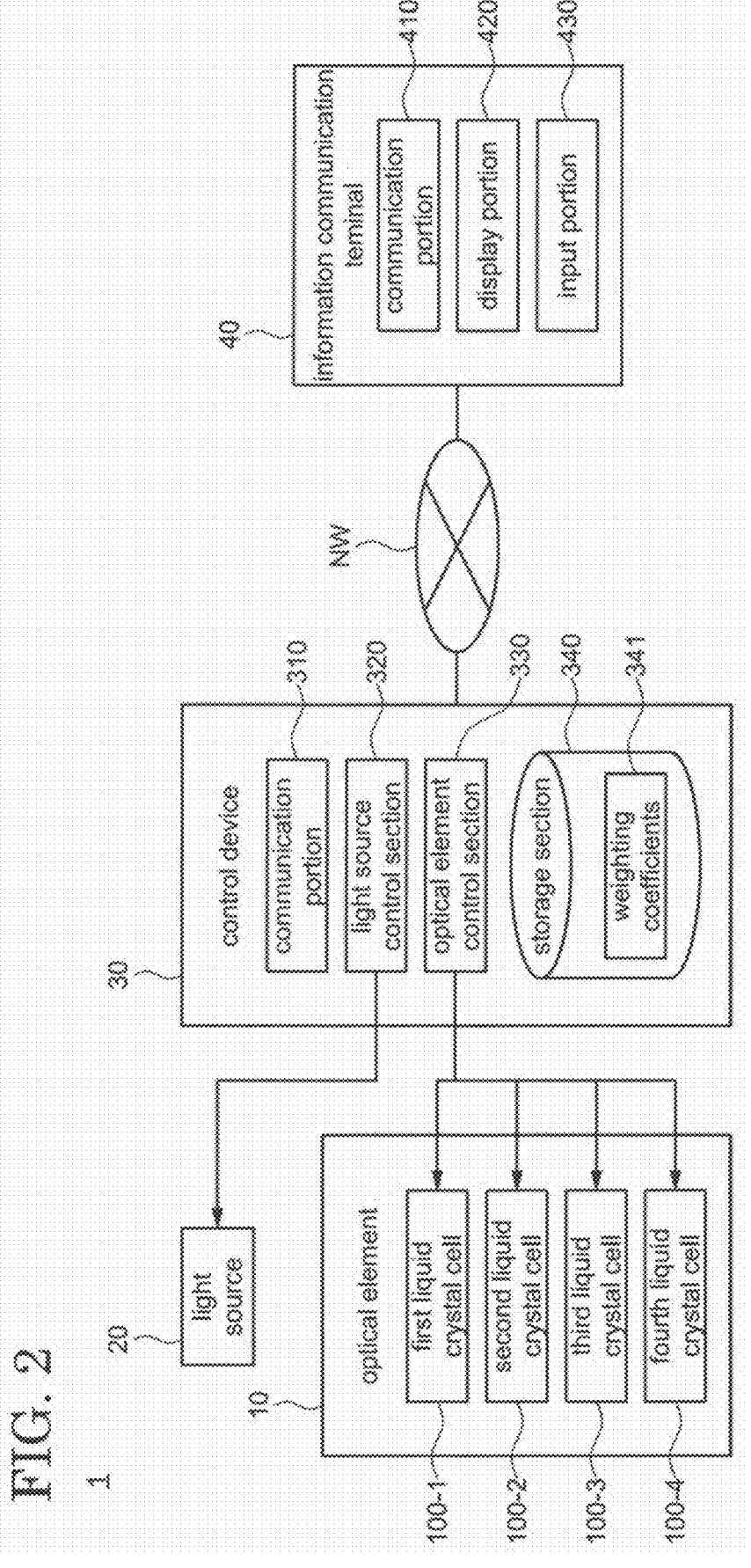
FIG. 2 is a block diagram showing a configuration of a lighting system according to an embodiment of the present invention.

FIG. 2 is a block diagram showing a configuration of the lighting system according to an embodiment of the present invention. As shown in FIG. 2, the control device 30 includes a communication portion 310, a light source control section 320, an optical element control section 330, and a storage section 340. The information communication terminal 40 includes a communication portion 410, a display portion 420, and an input portion 430.

The communication portion 310 is a communication interface capable of transmitting and receiving data or information. For example, the communication portion 310 is a LAN module or a Wi-Fi (registered trademark) module.

The light source control section 320 controls the operation of the light source 20. The control device 30 can execute a predetermined program to realize the function of the light source control section 320. For example, the light source control section 320 controls the on/off of power supply of the light source 20 based on the user input information transmitted from the information communication terminal 40. Further, the light source control section 320 adjusts the light intensity or color temperature of the light source 20 based on the user input information.

The optical element control section 330 controls the optical element 10 to change a lighting mode, a light distribution shape, and a gradation of a light distribution angle. The control device 30 can execute a predetermined program to realize a function of the optical element control section 330. For example, the optical element control section 330 calculates a voltage for controlling the optical element 10 based on the user input information transmitted from the information communication terminal 40, and inputs a signal including the calculated voltage to the liquid crystal cell 100. In the lighting system 1, the gradation of the light distribution can be changed according to the lighting mode. In addition, a degree of spread of the extracted light in the lighting system 1 is referred to as a gradation in the following description. The gradation can be set in multiple stages from the case where the spread of the extracted light is the smallest (there is no spread of the extracted light, or the emitted light from the light source is extracted without the spread) to the case where it is the largest. The gradation can be set to 8 stages, 16 stages, 32 stages, 64 stages, 128 stages, 256 stages, or the like. Alternatively, instead of the gradation, a configuration can be applied in which the light spreading state is set from 0% (no light spreading state, or the state in which the light emitted from the light source is extracted without the spread) to 100% (maximum light spreading state).

Although the lighting mode may be, for example, a wide-angle lighting mode that illuminates a wide range like a downlight, or a narrow-angle lighting mode that illuminates a narrow range like a spotlight, the lighting mode is not limited thereto. The details of the gradation control of the light distribution by the optical element control section 330 are described later.

The memory section 340 is a storage capable of storing data or information. The memory section 340 is, for example, a hard disk drive (HDD), a solid state drive (SSD), a read only memory (ROM), a random access memory (RAM), a flash memory, or the like. The memory section 340 stores a plurality of weighting coefficients 341 corresponding to a plurality of lighting modes.

Since the communication portion 410 has the same configuration as the communication portion 310, the description of the communication portion 410 is omitted.

The display portion 420 is a display interface that includes a screen and is capable of displaying images, etc., on the screen. The display portion 420 is, for example, a liquid crystal display device or an OLED display device.

The input portion 430 is a user interface through which a user can input data or information. The input portion 430 is, for example, a button, a keyboard, or a mouse that can accept a user operation. The input portion 430 can also generate user input information based on the user operation. The user input information is, for example, lighting mode information including a lighting mode selected by the user, and gradation information including a gradation selected by the user. The input portion 430 may be a touch screen integrated with the display portion 420.

[2. Configuration of Optical Element 10]

Figure 3A:
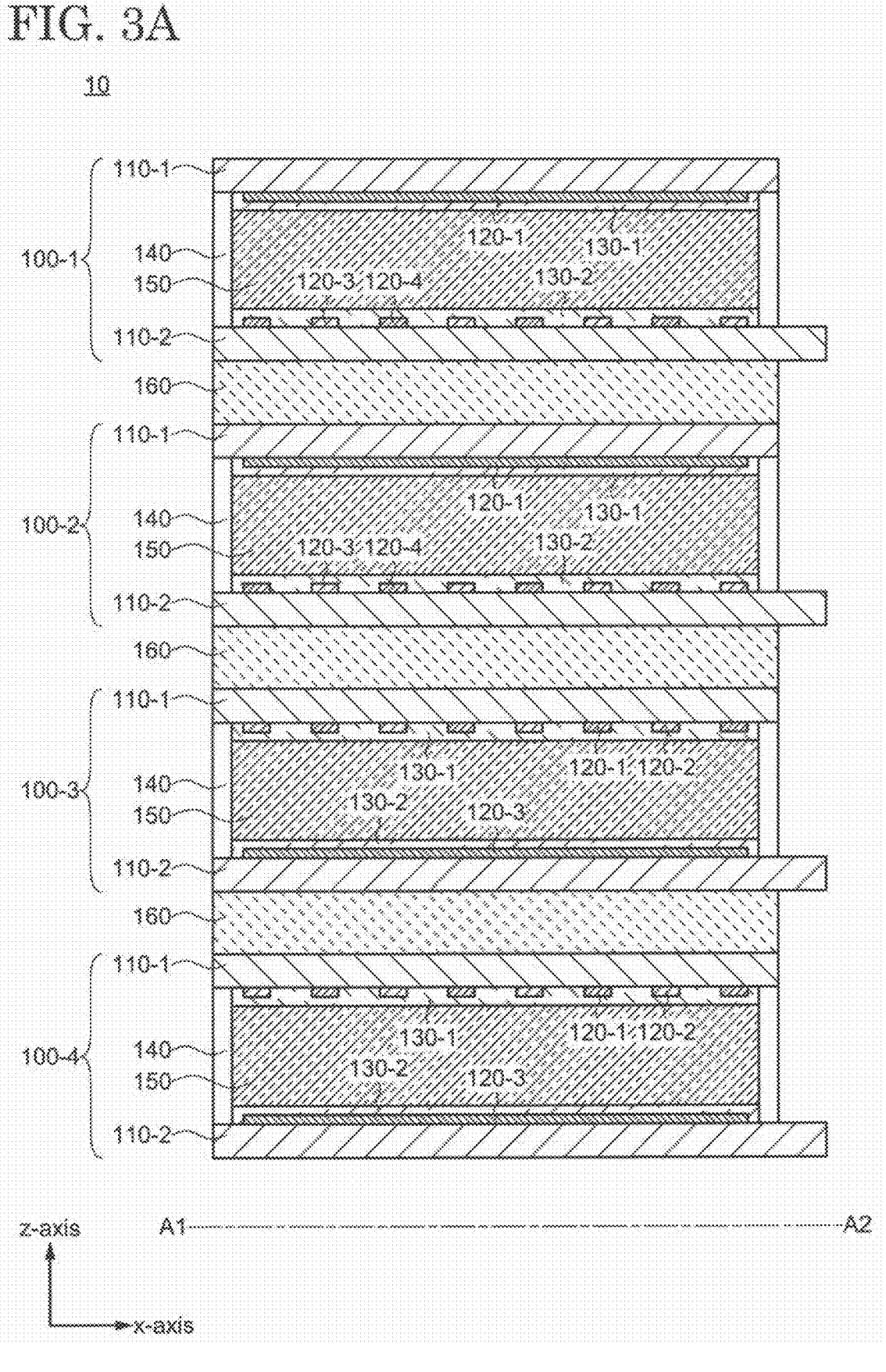
FIG. 3A is a schematic cross-sectional view showing a configuration of a lighting system according to an embodiment of the present invention.
Figure 3B:
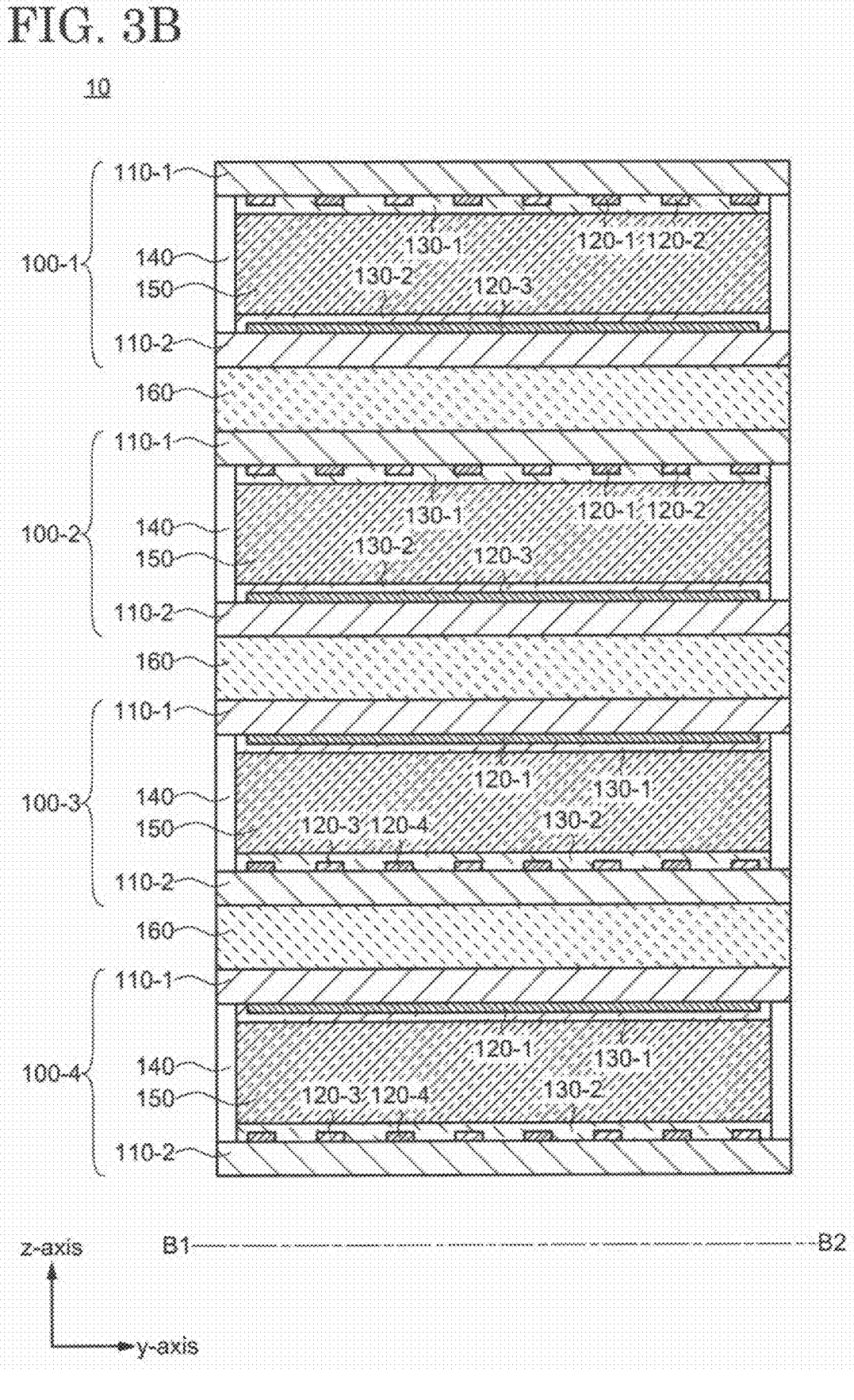
FIG. 3B is a schematic cross-sectional view showing a configuration of a lighting system according to an embodiment of the present invention.

Each of FIGS. 3A and 3B is a schematic cross-sectional view showing a configuration of the lighting system 1 according to an embodiment of the present invention. Specifically, FIG. 3A is a cross-sectional view of the optical element cut along line A1-A2 in FIG. 1, and FIG. 3B is a cross-sectional view of the optical element 10 cut along line B1-B2 in FIG. 1.

As shown in FIGS. 3A and 3B, each of the first liquid crystal cell 100-1 to the fourth liquid crystal cell 100-4 includes a first substrate 110-1, a second substrate 110-2, a plurality of first transparent electrodes 120-1, a plurality of second transparent electrodes 120-2, a plurality of third transparent electrodes 120-3, a plurality of fourth transparent electrodes 120-4, a first alignment film 130-1, a second alignment film 130-2, a sealing member 140, and a liquid crystal layer 150. The first transparent electrodes 120-1 and the second transparent electrodes 120-2 are alternately provided on the first substrate 110-1. That is, the plurality of first transparent electrodes 120-1 and the plurality of second transparent electrodes 120-2 are arranged in a comb-teeth pattern. The first alignment film 130-1 is provided on the first substrate 110-1 so as to cover the first transparent electrodes 120-1 and the second transparent electrodes 120-2. The third transparent electrode 120-3 and the fourth transparent electrode 120-4 are provided alternately on the second substrate 110-2. That is, the plurality of third transparent electrodes 120-1 and the plurality of fourth transparent electrodes 120-4 are arranged in a comb-like pattern. The second alignment film 130-2 is provided on the second substrate 110-2 so as to cover the third transparent electrodes 120-3 and the fourth transparent electrodes 120-4. The first substrate 110-1 and the second substrate 110-2 are disposed such that the first transparent electrodes 120-1 and the second transparent electrodes 120-2 face the third transparent electrodes 120-3 and the fourth transparent electrodes 120-4, and are bonded to each other via the sealing member 140 provided on the periphery of the first substrate 110-1 and the second substrate 110-2. A liquid crystal is sealed in a space surrounded by the first substrate 110-1 (more specifically, the first alignment film 130-1), the second substrate 110-2 (more specifically, the second alignment film 130-2), and the sealing member 140, and the liquid crystal layer 150 is provided between the first substrate 110-1 and the second substrate 110-2.

An optical elastic resin layer 160 is provided between the first liquid crystal cell 100-1 and the second liquid crystal cell 100-2. Similarly, the optical elastic resin layers 160 are provided between the second liquid crystal cell 100-2 and the third liquid crystal cell 100-3, and between the third liquid crystal cell 100-3 and the fourth liquid crystal cell 100-4. For example, an adhesive containing a light-transmitting acrylic resin can be used for the optical elastic resin layer 160. That is, the optical elastic resin layer 160 can bond and fix two adjacent liquid crystal cells 100 together.

For example, a rigid substrate having light-transmitting properties such as a glass substrate, a quartz substrate, or a sapphire substrate is used as each of the first substrate 110-1 and the second substrate 110-2. Further, a flexible substrate having light-transmitting properties such as a polyimide resin substrate, an acrylic resin substrate, a siloxane resin substrate, or a fluorine resin substrate can also be used as each of the first substrate 110-1 and the second substrate 110-2.

Each of the first transparent electrode 120-1, the second transparent electrode 120-2, the third transparent electrode 120-3, and the fourth transparent electrode 120-4 functions as an electrode for forming an electric field in the liquid crystal layer 150. For example, a transparent conductive material such as indium tin oxide (ITO) or indium zinc oxide (IZO) is used for each of the first transparent electrode 120-1, the second transparent electrode 120-2, the third transparent electrode 120-3, and the fourth transparent electrode 120-4.

In the first liquid crystal cell 100-1 and the second liquid crystal cell 100-2, the first transparent electrode 120-1 and the second transparent electrode 120-2 extend in an x-axis direction, and the third transparent electrode 120-3 and the fourth transparent electrode 120-4 extend in a y-axis direction. In the third liquid crystal cell 100-3 and the fourth liquid crystal cell 100-4, the first transparent electrode 120-1 and the second transparent electrode 120-2 extend in the y-axis direction, and the third transparent electrode 120-3 and the fourth transparent electrode 120-4 extend in the x-axis direction.

In addition, when the first transparent electrode 120-1 to the fourth transparent electrode 120-4 are not particularly distinguished, they may be referred to as a transparent electrode 120.

Each of the first alignment film 130-1 and the second alignment film 130-2 aligns the liquid crystal molecules in the liquid crystal layer 150 in a predetermined direction. For example, a polyimide resin or the like can be used for each of the first alignment film 130-1 and the second alignment film 130-2. In addition, each of the first alignment film 130-1 and the second alignment film 130-2 may be imparted with an alignment property by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An alignment treatment is performed on the first alignment film 130-1 so that the liquid crystal molecules on the side of the first substrate 110-1 in the liquid crystal layer 150 are aligned in a direction orthogonal to the extending direction of the first transparent electrode 120-1 and the second transparent electrode 120-2. An alignment treatment is performed on the second alignment film 130-2 so that the liquid crystal molecules on the side of the second substrate 110-2 in the liquid crystal layer 150 are aligned in a direction orthogonal to the extending direction of the third transparent electrode 120-3 and the fourth transparent electrode 120-4. Therefore, in the first liquid crystal cell 100-1 and the second liquid crystal cell 100-2, the long axes of the liquid crystal molecules on the side of the first substrate 110-1 are aligned in the y-axis direction, and the long axes of the liquid crystal molecules on the side of the second substrate 110-2 are aligned in the x-axis direction. Further, in the third liquid crystal cell 100-3 and the fourth liquid crystal cell 100-4, the long axes of the liquid crystal molecules on the side of the first substrate 110-1 are aligned in the x-axis direction, and the long axes of the liquid crystal molecules on the side of the second substrate 110-2 are aligned in the y-axis direction. In addition, although it is described in the above description that the alignment direction of the liquid crystal molecules and the extending direction of the transparent electrode 120 are orthogonal to each other, the alignment direction of the liquid crystal molecules and the extending direction of the transparent electrode 120 may intersect at an angle other than 90 degrees, for example, an angle greater than or equal to 85 degrees and less than 90 degrees.

An adhesive material containing epoxy resin, acrylic resin, or the like can be used for the sealing member 140. The adhesive material may be of an ultraviolet curable type or a heat curable type.

The liquid crystal layer 150 can refract transmitted light or change a polarization state of the transmitted light according to an alignment state of the liquid crystal molecules. For example, nematic liquid crystals can be used as the liquid crystal of the liquid crystal layer 150. Although a positive liquid crystal is described as the liquid crystal in the present embodiment, a negative liquid crystal can also be adopted by changing the initial alignment directions of the liquid crystal molecules. Further, the liquid crystal preferably contains a chiral agent that imparts twist to the liquid crystal molecules.

[3. Electrode Pattern of Liquid Crystal Cell 100]

Figure 4A:
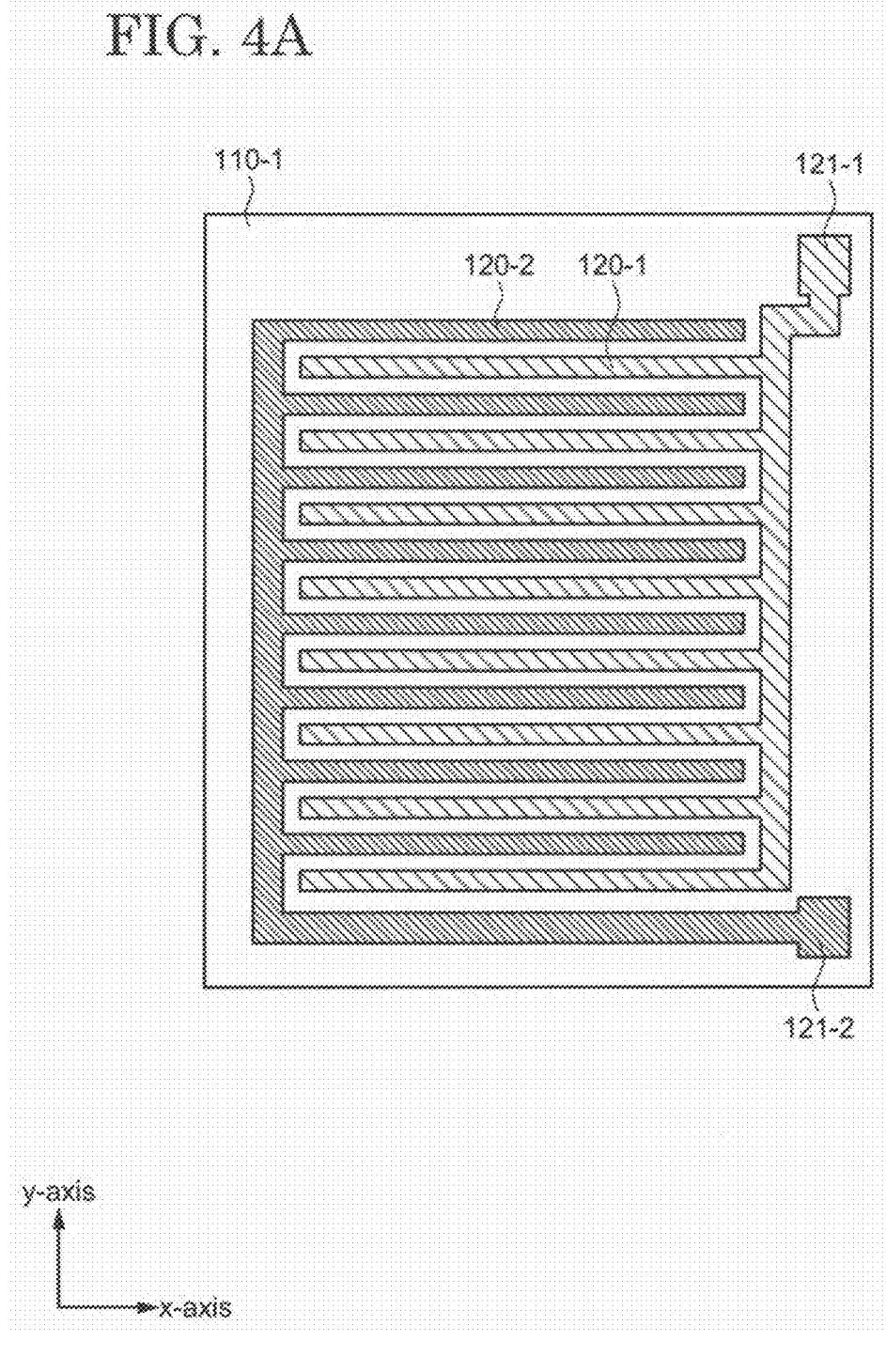
FIG. 4A is a schematic plan view showing an electrode pattern of a liquid crystal cell included in an optical element of a lighting system according to an embodiment of the present invention.
Figure 4B:
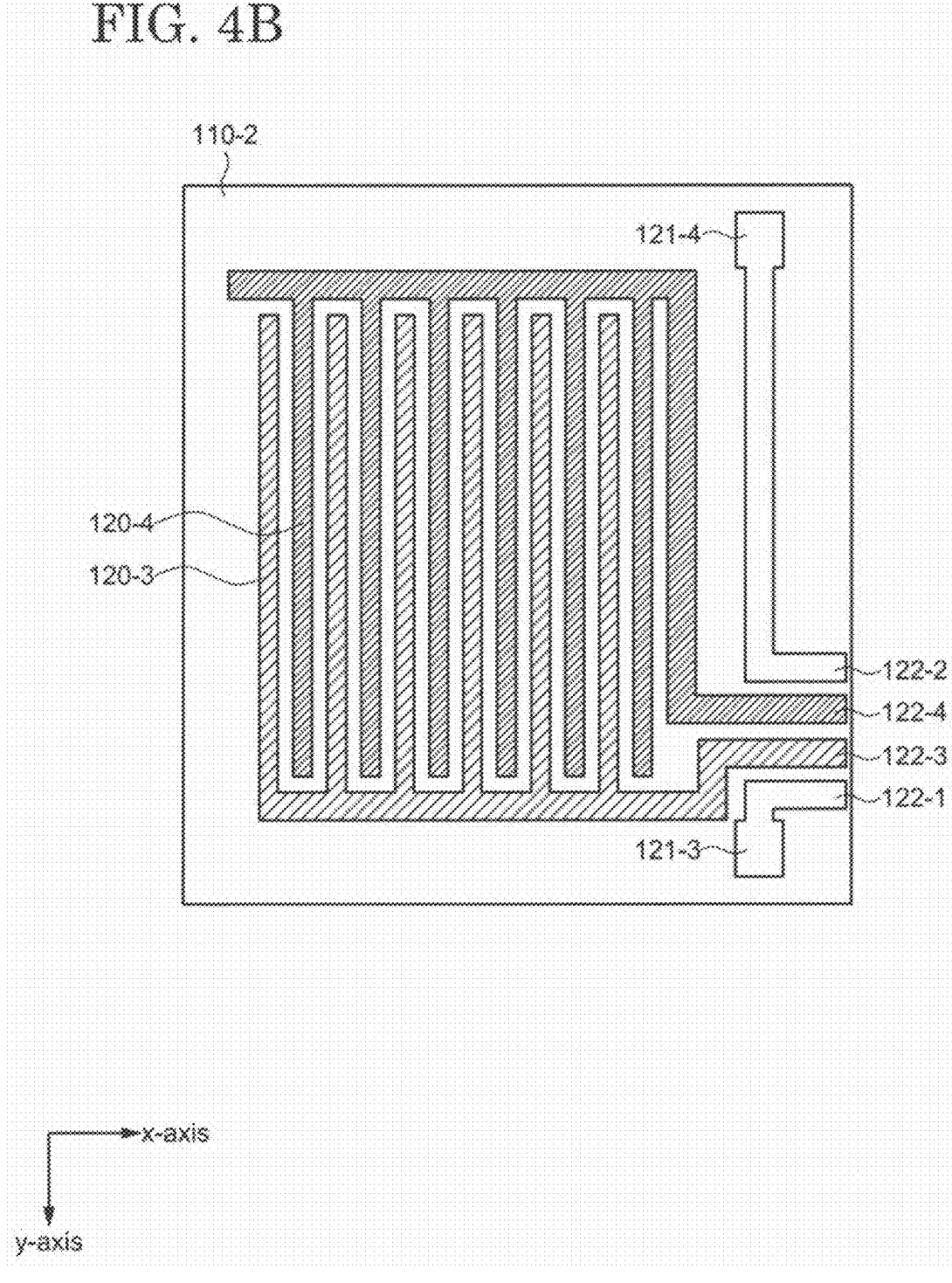
FIG. 4B is a schematic plan view showing an electrode pattern of a liquid crystal cell included in an optical element of a lighting system according to an embodiment of the present invention.

Each of FIGS. 4A and 4B is a schematic plan view showing an electrode pattern of the liquid crystal cell 100 included in the optical element 10 of the lighting system 1 according to an embodiment of the present invention. Specifically, FIG. 4A is a plan view showing an electrode pattern formed on the first substrate 110-1 of the first liquid crystal cell 100-1, and FIG. 4B is a plan view showing an electrode pattern formed on the second substrate 110-2 of the first liquid crystal cell 100-1.

As shown in FIG. 4A, a first connection pad 121-1 and a second connection pad 121-2 are provided on the first substrate 110-1. The plurality of first transparent electrodes 120-1 are electrically connected to the first connection pad 121-1. The plurality of second transparent electrodes 120-2 are electrically connected to the second connection pad 121-2.

As shown in FIG. 4B, a third connection pad 121-3, a fourth connection pad 121-4, a first terminal 122-1, a second terminal 122-2, a third terminal 122-3, and a fourth terminal 122-4 are provided on the second substrate 110-2. The plurality of third transparent electrodes 120-3 are electrically connected to the third terminal 122-3. The plurality of fourth transparent electrodes 120-4 are electrically connected to the fourth terminal 122-4. Further, the third connection pad 121-3 is electrically connected to the first terminal 122-1. The fourth connection pad 121-4 is electrically connected to the second terminal 122-2.

When the first substrate 110-1 and the second substrate 110-2 are bonded to each other, the first connection pad 121-1 and the second connection pad 121-2 overlap the third connection pad 121-3 and the fourth connection pad 121-4, respectively. A conductive member such as silver paste is provided between the first connection pad 121-1 and the third connection pad 121-3, and the first connection pad 121-1 and the third connection pad 121-3 are electrically connected to each other via the conductive member. Similarly, a conductive member is provided between the second connection pad 121-2 and the fourth connection pad 121-4, and the second connection pad 121-2 and the fourth connection pad 121-4 are electrically connected to each other via the conductive member. Therefore, the first transparent electrode 120-1 and the second transparent electrode 120-2 on the first substrate 110-1 are electrically connected to the first terminal 122-1 and the second terminal 122-2, respectively.

Electrode patterns of the second liquid crystal cell 100-2 are the same as those of the first liquid crystal cell 100-1. The configurations of the electrode patterns of the third liquid crystal cell 100-3 and the fourth liquid crystal cell 100-4 are the same as those of the first liquid crystal cell 100-1, except that the extending direction of the transparent electrode 120 is rotated by 90 degrees.

In the liquid crystal cell 100, the first terminal 122-1 to the fourth terminal 122-4 on the second substrate 110-2 are exposed from the first substrate 110-1. In each of the first liquid crystal cell 100-1 to the fourth liquid crystal cell 100-4, the exposed first terminal 122-1 to the fourth terminal 122-4 are provided with flexible printed circuits (FPCs) 170 (see FIG. 1). The FPCs 170 are electrically connected to the control device 30. Therefore, the control device 30 can input signals to the first transparent electrode 120-1 to the fourth transparent electrode 120-4 of the liquid crystal cell 100 via the FPCs 170 to control the optical element 10.

[4. Optical Characteristics of Liquid Crystal Cell 100]

Figure 5A:
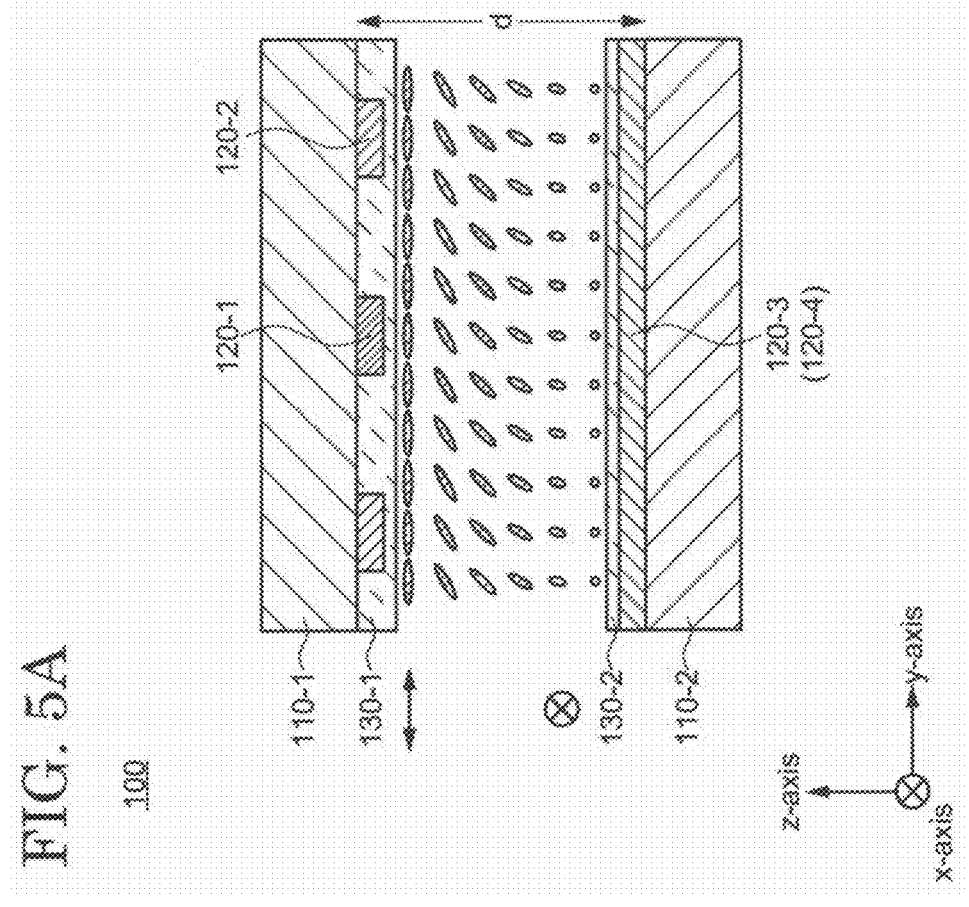
FIG. 5A is a schematic diagram illustrating optical characteristics of a liquid crystal cell included in an optical element of a lighting system according to an embodiment of the present invention.
Figure 5B:
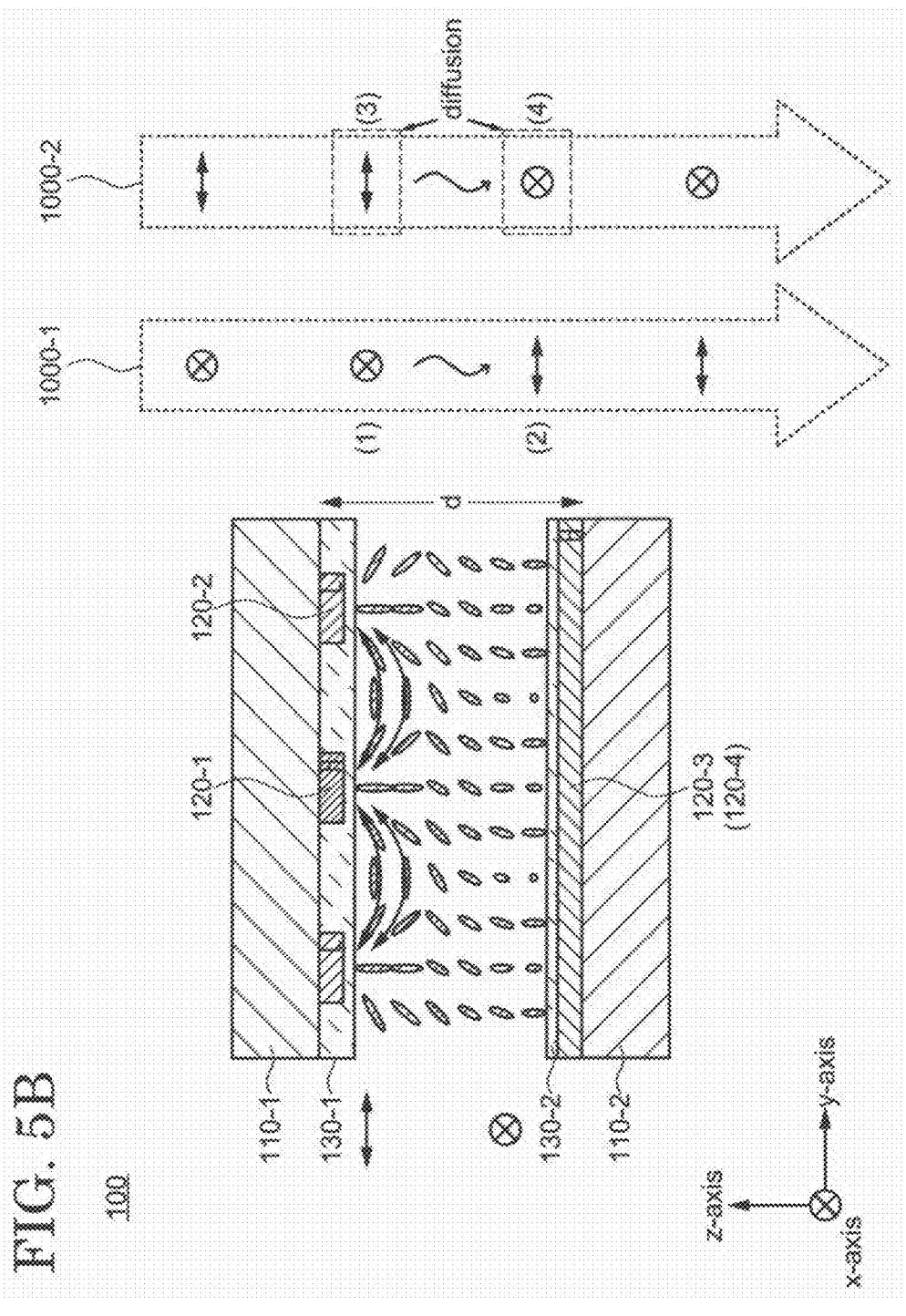
FIG. 5B is a schematic diagram illustrating optical characteristics of a liquid crystal cell included in an optical element of a lighting system according to an embodiment of the present invention.

Each of FIGS. 5A and 5B is a schematic diagram illustrating optical characteristics of the liquid crystal cell 100 included in the optical element 10 of the lighting system 1 according to an embodiment of the present invention. Specifically, FIG. 5A shows the liquid crystal cell 100 in a state where no voltages are applied to the transparent electrodes 120, and FIG. 5B shows the liquid crystal cell 100 in a state where voltages are applied to the transparent electrodes 120.

As shown in FIG. 5A, the liquid crystal molecules on the side of the first substrate 110-1 in the liquid crystal layer 150 are aligned in the y-axis direction, and the liquid crystal molecules on the side of the second substrate 110-2 in the liquid crystal layer 150 are aligned in the x-axis direction. Therefore, when no voltage is applied to any of the first transparent electrode 120-1 to the fourth transparent electrode 120-4, the liquid crystal molecules in the liquid crystal layer 150 are aligned so as to be twisted 90 degrees in the c-axis direction as they move from the first substrate 110-1 to the second substrate 110-2. Further, a polarization plane (a polarization axis or a direction of a polarization component) of the light transmitting through the liquid crystal layer 150 is rotated 90 degrees according to the alignment of the liquid crystal molecules. More specifically, a P-polarization component incident on the liquid crystal cell 100 becomes an S-polarization component by transmitting through the liquid crystal layer 150 of the liquid crystal cell 100, and the S-polarization component incident on the liquid crystal cell 100 becomes the P-polarized component. Such a phenomenon in which the polarization components transition may be called optical rotation.

On the other hand, when a voltage is applied so that a potential difference occurs between two adjacent transparent electrodes 120, an electric field (hereinafter, referred to as a "lateral electric field") is generated between the two adjacent transparent electrodes 120, and the alignment of the liquid crystal molecules changes. As shown in FIG. 5B, the liquid crystal molecules in the liquid crystal layer 150 are aligned so as to be twisted 90 degrees in the c-axis direction from the first substrate 110-1 toward the second substrate 110-2, while the liquid crystal molecules closer to the first substrate 110-1 are arranged in a convex arc shape with respect to the first substrate 110-1 by the lateral electric field between the first transparent electrode 120-1 and the second transparent electrode 120-2, and the liquid crystal molecules closer to the second substrate 110-2 are arranged in a convex arc shape with respect to the second substrate 110-2 by the lateral electric field between the third transparent electrode 120-3 and the fourth transparent electrode 120-4. The liquid crystal molecules arranged in the convex arc shape have a refractive index distribution, and light having the same polarization direction as the alignment direction of the liquid crystal molecules is diffused. In addition, since the cell gap d, which is the distance between the first substrate 110-1 and the second substrate 110-2, is sufficiently larger than the distance between two adjacent transparent electrodes 120 (for example, 10 μm≤d≤30 μm), the alignment of the liquid crystal molecules located closer to the center between the first substrate 110-1 and the second substrate 110-2 hardly changes.

The light emitted from light source 20 includes a polarization component in the x-axis direction (hereinafter, referred to as the "P-polarization component") and a polarization component in the y-axis direction (hereinafter, referred to as the "S polarization component"). However, for convenience, the light emitted from the light source 20 is described as being divided into a first light 1000-1 having the P-polarization component and a second light 1000-2 having the S polarized component in the following description.

Since the P-polarization component of the first light 1000-1 incident on the first substrate 110-1 is different from the alignment direction of the liquid crystal molecules on the side of the first substrate 110-1, the first light 1000-1 is not diffused (see (1) in FIG. 5B). Further, the first light 1000-1 is optically rotated while transmitting through the liquid crystal layer 150, and the polarization component changes from the P-polarization component to the S-polarization component. Since the S-polarization component of the first light 1000-1 is different from the alignment direction of the liquid crystal molecules on the side of the second substrate 110-2, the first light 1000-1 is not diffused (see (2) in FIG. 5B).

Since the S-polarization component of the second light 1000-2 incident on the first substrate 110-1 is the same as the alignment direction of the liquid crystal molecules on the side of the first substrate 110-1, the second light 1000-2 is diffused in the y-axis direction in accordance with the refractive index distribution of the liquid crystal molecules (see (3) in FIG. 5B). Further, the second light 1000-2 is optically rotated while transmitting through the liquid crystal layer 150, and the polarization component changes from the S-polarization component to the P-polarization component. Since the P-polarization component of the second light 1000-2 is the same as the alignment direction of the liquid crystal molecules on the side of the second substrate 110-2, the second light 1000-2 is diffused in the x-axis direction in accordance with the refractive index distribution of the liquid crystal molecules (see (4) in FIG. 5B).

[5. Light Distribution Control]

[5-1. Control of Light Distribution Shape]

When the respective voltages applied to the first transparent electrodes 120-1 to fourth transparent electrodes 120-4 of the first liquid crystal cell 100-1 to fourth liquid crystal cell 100-4 are controlled, the light distribution shape of the light transmitting through the optical element 10 can be changed.

Figure 6A:
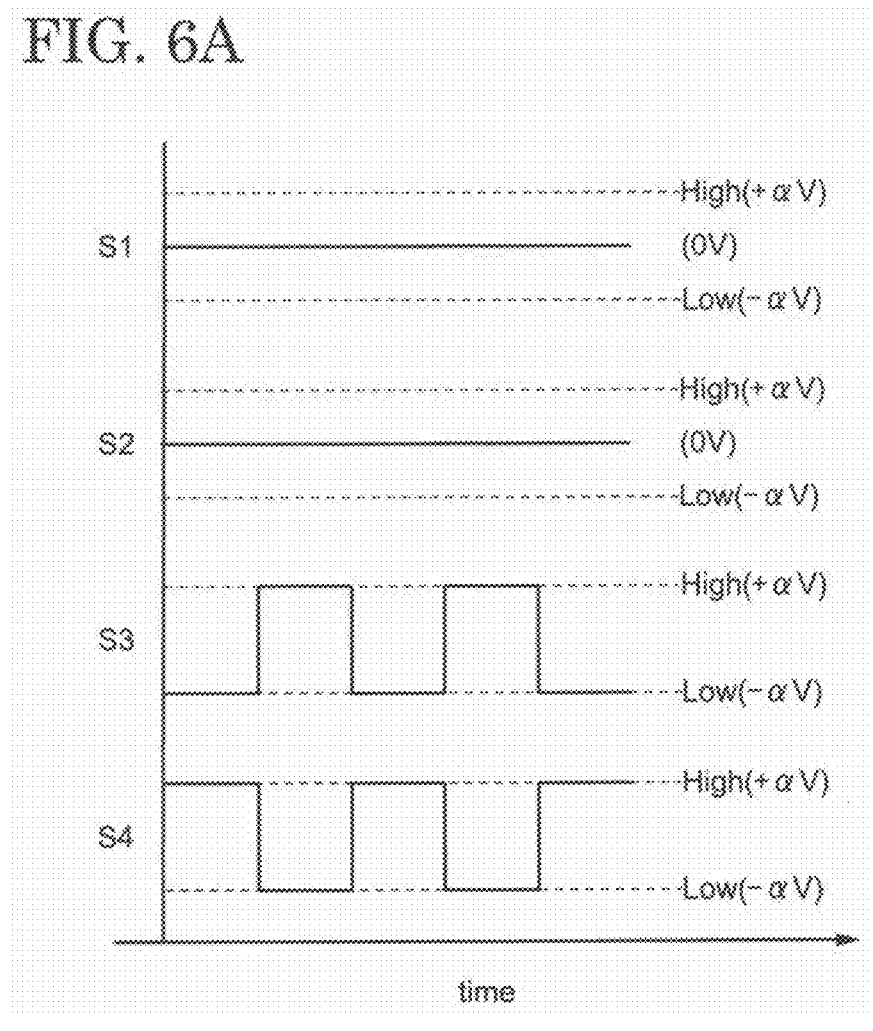
FIG. 6A is a timing chart of signals input to transparent electrodes of an optical element to control a light distribution shape in a lighting system according to an embodiment of the present invention.
Figure 6B:
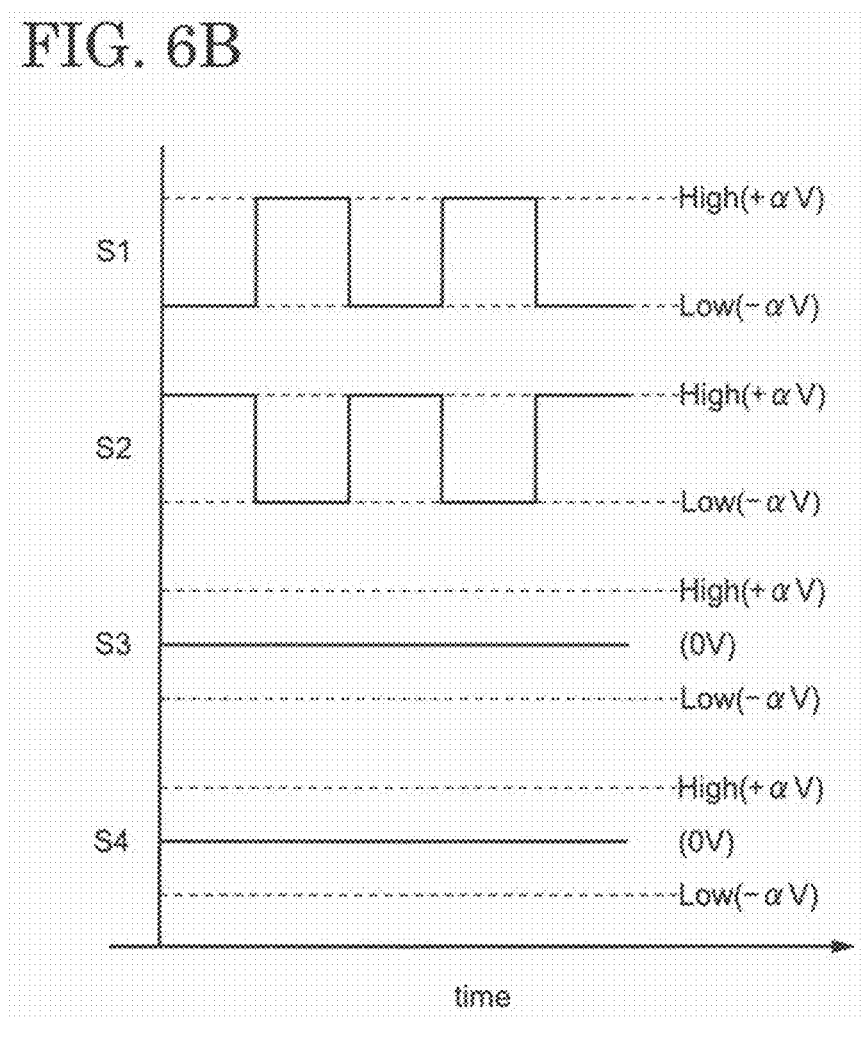
FIG. 6B is a timing chart of signals input to transparent electrodes of an optical element to control a light distribution shape in a lighting system according to an embodiment of the present invention.
Figure 6C:
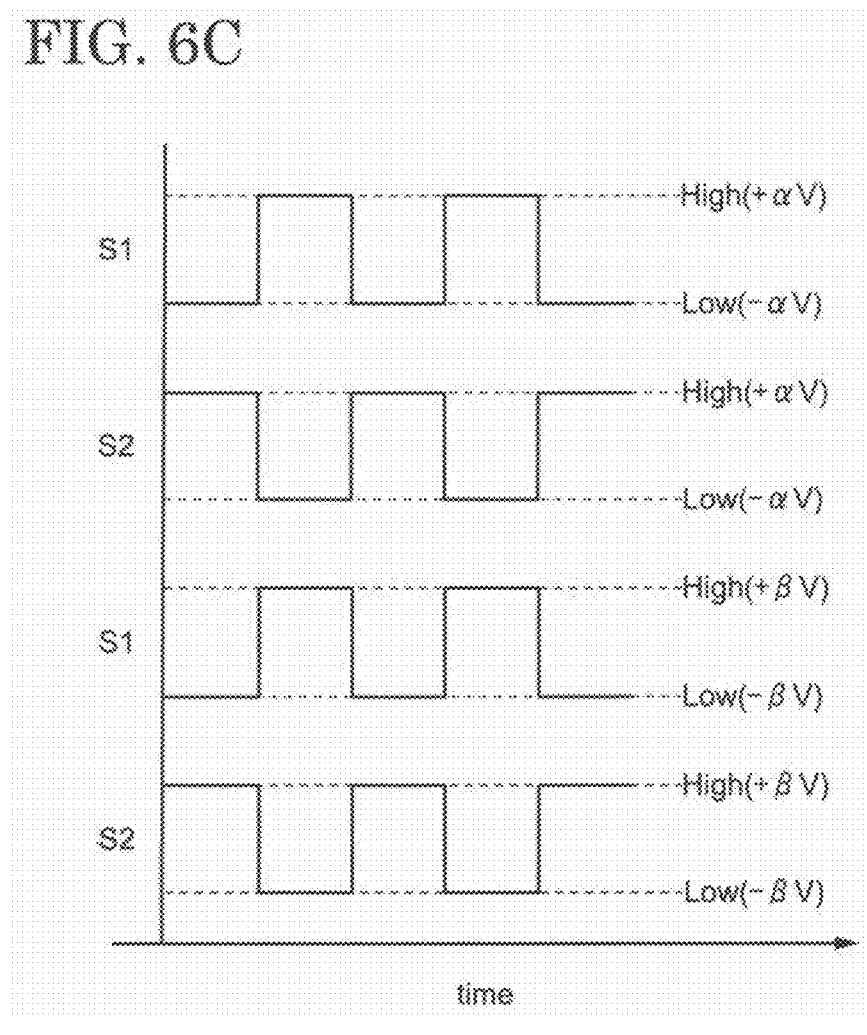
FIG. 6C is a timing chart of signals input to transparent electrodes of an optical element to control a light distribution shape in a lighting system according to an embodiment of the present invention.

Each of FIGS. 6A to 6C is a timing chart of signals input to the transparent electrodes 120 of the optical element 10 to control the light distribution shape in the lighting system 1 according to an embodiment of the present invention. Hereinafter, for convenience, a high voltage is +α V (or β+V), a low voltage is −α V (or −β V), and an intermediate voltage is 0 V. However, the high voltage, the low voltage, and the intermediate voltage are not limited thereto. The high voltage may be any voltage greater than the low voltage and the intermediate voltage. Further, the intermediate voltage may be any voltage between the high voltage and the low voltage. For example, the high voltage, the low voltage, and the intermediate voltage may be 30 V, 0 V, and 15 V, respectively.

Although the voltage included in the signal input to the transparent electrode 120 is a square wave in which high and low voltages are repeated, or a constant intermediate voltage, the voltage is not limited thereto.

FIGS. 6A to 6C show a first signal S1, a second signal S2, a third signal S3, and a fourth signal S4. The first signal S1 is input to the first transparent electrodes 120-1 of the first liquid crystal cell 100-1 and the second liquid crystal cell 100-2, and the third transparent electrodes 120-3 of the third liquid crystal cell 100-3 and the fourth liquid crystal cell 100-4. The second signal S2 is input to the second transparent electrodes 120-2 of the first liquid crystal cell 100-1 and the second liquid crystal cell 100-2, and the fourth transparent electrodes 120-4 of the third liquid crystal cell 100-3 and the fourth liquid crystal cell 100-4. The third signal S3 is input to the third transparent electrodes 120-3 of the first liquid crystal cell 100-1 and the second liquid crystal cell 100-2, and the first transparent electrodes 120-1 of the third liquid crystal cell 100-3 and the fourth liquid crystal cell 100-4. The fourth signal S4 is input to the fourth transparent electrodes 120-4 of the first liquid crystal cell 100-1 and the second liquid crystal cell 100-2, and the second transparent electrodes 120-2 of the third liquid crystal cell 100-3 and the fourth liquid crystal cell 100-4.

In the case of the timing chart shown in FIG. 6A, a lateral electric field is generated between two adjacent transparent electrodes 120 extending in the y-axis direction. In this case, liquid crystal molecules whose long axes are aligned in the x-axis direction are arranged in a convex arc shape. Therefore, the light transmitting through the optical element 10 is diffused in the x-axis direction in each of the first liquid crystal cell 100-1 to the fourth liquid crystal cell 100-4. Accordingly, in the timing chart shown in FIG. 6A, a linear light distribution spreading in the x-axis direction can be obtained.

In the case of the timing chart shown in FIG. 6B, a lateral electric field is generated between two adjacent transparent electrodes 120 extending in the x-axis direction. In this case, liquid crystal molecules whose long axes are aligned in the y-axis direction are arranged in a convex arc shape. Therefore, the light transmitting through the optical element 10 is diffused in the y-axis direction in each of the first liquid crystal cell 100-1 to the fourth liquid crystal cell 100-4. Accordingly, in the timing chart shown in FIG. 6B, a linear light distribution spreading in the y-axis direction can be obtained.

In the case of the timing chart shown in FIG. 6C, lateral electric fields are generated between two adjacent transparent electrodes 120 extending in the y-axis direction and between two adjacent transparent electrodes 120 extending in the x-axis direction. In this case, not only the liquid crystal molecules on the side of one substrate 110 of the liquid crystal cell 100 whose long axes are aligned in the x-axis direction, but also the liquid crystal molecules on the side of the other substrate 110 of the liquid crystal cell 100 whose long axes are aligned in the y-axis direction are arranged in a convex arc shape. Therefore, the light transmitting through the optical element 10 is diffused in the x-axis direction and the y-axis direction in each of the first liquid crystal cell 100-1 to the fourth liquid crystal cell 100-4. Accordingly, in the timing chart shown in FIG. 6C, when α=β, a circular light distribution can be obtained. Further, when α<β, an elliptical light distribution having a major axis in the x-axis direction can be obtained. Furthermore, when β>α, an elliptical light distribution having a long axis in the y-axis direction can be obtained.

[5-2. Gradation Control of Light Distribution Angle]

When the magnitudes of the voltages applied to the transparent electrodes 120 are changed, the degree of light diffusion in the liquid crystal cell 100 can be changed. Therefore, when the magnitudes of the voltages applied to the first transparent electrode 120-1 to the fourth transparent electrode 120-4 of each of the first liquid crystal cell 100-1 to the fourth liquid crystal cell 100-4 are changed, it is possible to control the gradation of the light distribution angle of the light transmitting through the optical element 10. Here, the definitions of the light distribution angle are described with reference to FIGS. 7A and 7B.

Figures 7A, 7B:
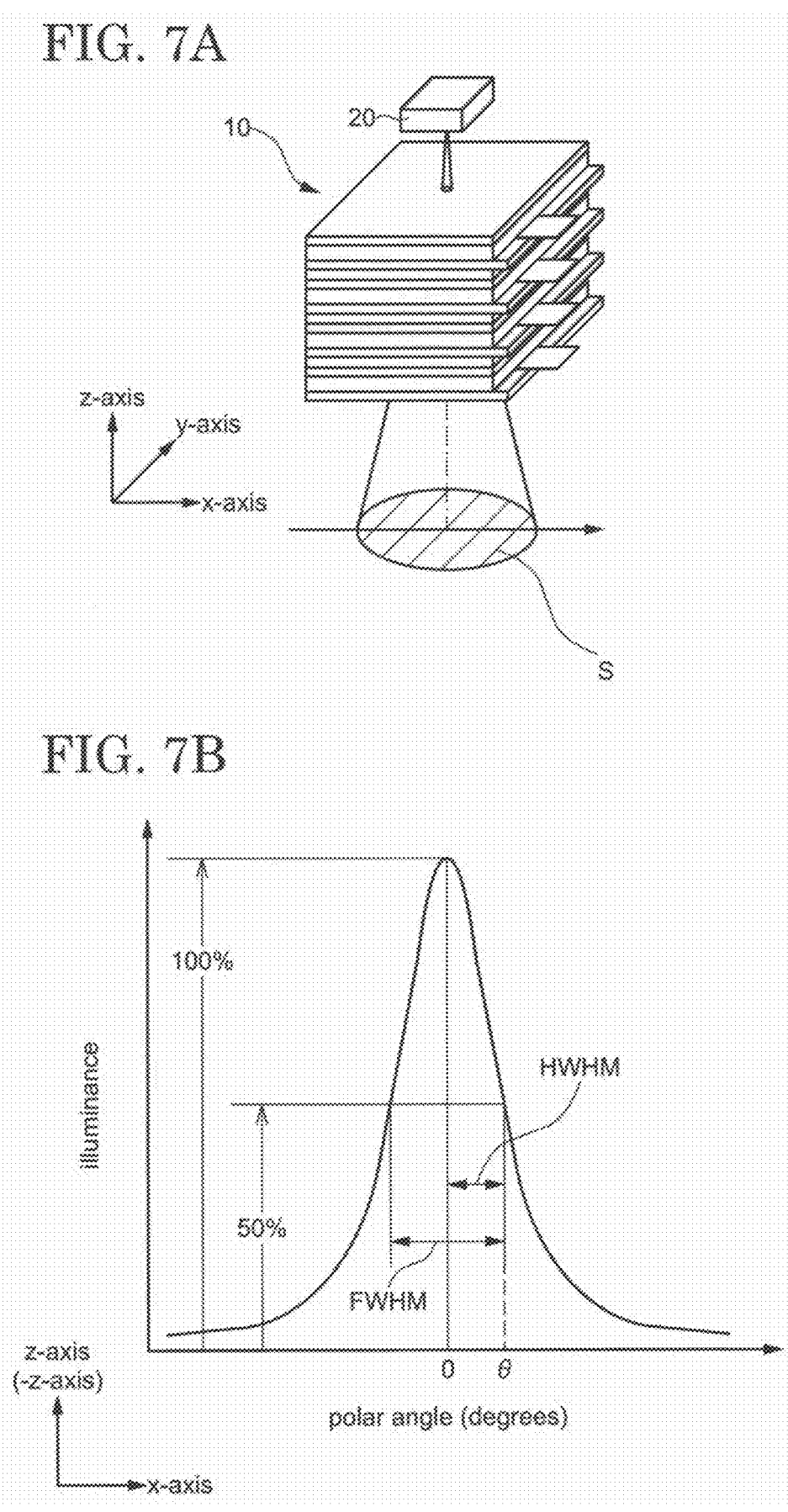
FIG. 7A is a schematic diagram illustrating definitions of a light distribution angle and a half width at half maximum in a lighting system according to an embodiment of the present invention.
FIG. 7B is a schematic diagram illustrating definitions of a light distribution angle and a half width at half maximum in a lighting system according to an embodiment of the present invention.

Each of FIGS. 7A and 7B is a schematic diagram illustrating the definitions of the light distribution angle and the half width at half maximum in the lighting system 1 according to an embodiment of the present invention. More specifically, FIG. 7B is a graph showing the change in illuminance with respect to a polar angle when the light source 20 is located at a polar angle of 0 degrees in the case of viewing the state of FIG. 7A from the y-axis direction, with the horizontal axis representing the polar angle in the x-axis direction and the vertical axis representing the illuminance of the surface S illuminated by the lighting system 1.

The light distribution of the light emitted from the light source 20 is controlled by the optical element 10, and light having a predetermined light distribution shape is projected onto the projection surface. The illuminance of the light on the projection surface is greatest at the center (directly below the light source 20) and decreases as it moves away from the center. The ½ illuminance angle is essentially defined as the angle between a line in the vertical direction of the light source 20 and a line connecting the light source 20 and a point where the illuminance is 50% of the illuminance directly below the light source 20. However, in FIG. 7B, the ½ illuminance angle is a polar angle at which the illuminance is 50% in an illuminance graph when the illuminance directly below the light source 20 is 100%. In the present specification, the light distribution angle is equal to the ½ illuminance angle and may be referred to as a half width at half maximum (HWHM). That is, the light distribution angle can be expressed as the half width at half maximum 6 degrees. Therefore, for convenience, the half width at half maximum may be used to explain the light distribution angle in the following description. In addition, twice the half width at half maximum is a full width at half maximum (FWHM).

Figure 8:
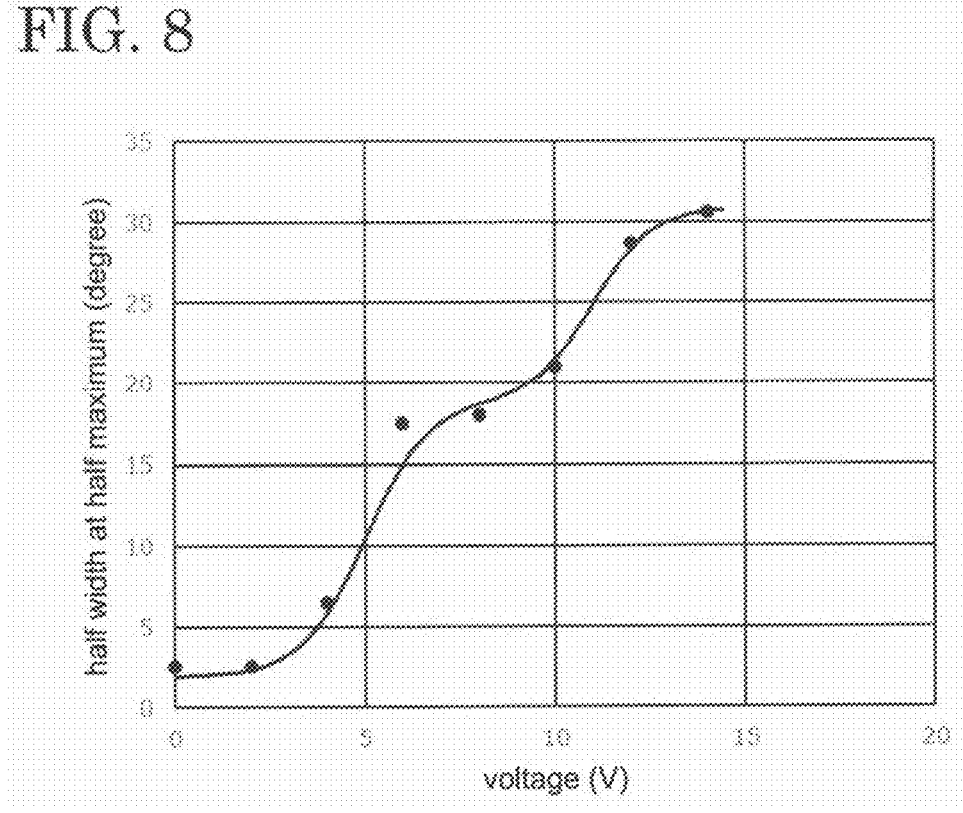
FIG. 8 is a graph showing a correlation between a voltage applied to a transparent electrode of an optical element and a half width at half maximum in a lighting system according to an embodiment of the present invention.

FIG. 8 is a graph showing the correlation between the voltage applied to the transparent electrode 120 of the optical element 10 and the half width at half maximum in the lighting system 1 according to an embodiment of the present invention. FIG. 8 shows data (black circles in FIG. 8) measured in the fabricated lighting system 1 and its approximation curve.

As shown in FIG. 8, the half width at half maximum with respect to the voltage applied to the transparent electrode 120 shows a complex curve. For example, a function f(x) of the approximation curve shown in FIG. 8 can be expressed by the following equation (1) as the sum of two sigmoid functions.

$$f(x) = k_1 \left( \frac{1}{1 + e^{-1.2(x-5)}} + z \right) + k_2 \left( \frac{1}{1 + e^{-1.3(x-11)}} \right) \tag{1}$$

In equation (1), $k_1$ and $k_2$ are proportionality constants, and z is a predetermined coefficient.

In addition, equation (1) is an example, and the function f(x) for calculating the half width at half maximum with respect to the voltage x is not limited to equation (1). In particular, each constant in equation (1) may vary depending on the number of liquid crystal cells 100 included in the optical element 10 and the type of light source 20. The function f(x) can be calculated based on measured data, and may be any function that indicates the correlation between the voltage x applied to the transparent electrode 120 of the liquid crystal cell 100 and the half width at half maximum.

In the gradation control of the light distribution of the lighting system 1, the light distribution angle can be changed by a user operation. Here, since the correlation between the light distribution angle and the voltage is complicated as shown by the above-described function f(x), simply allocating the voltage x evenly to the gradation level operated by the user may result in a large or small change in the light distribution angle depending on the gradation level, which may not match the user's operational feeling. Further, it may be difficult to minutely adjust the light distribution angle depending on the gradation level. Therefore, a function g(p) is introduced, which represents the correlation between the gradation level p and the light distribution angle, as shown in equation (2) in the lighting system 1.

$$g(p) = a \left( \frac{p}{p_{max}} \right)^b + c \quad (2)$$

In equation (2), a and c are arbitrary constants, and b is a weighting coefficient. Here, the constants a and c are a>0 and c>0, and the weighting coefficient b is b≥1. In the function g(p), the light distribution angle increases as the gradation level p increases. Although the number of gradation levels p, that is, the number of gradations, is 256 (gradation levels 0 to 255), for example, the number of gradations levels p is not limited thereto. Further, $p_{max}$ is the maximum number of the set gradation numbers, and when the gradation levels are 0 to 255, $p_{max}$ is 255. Depending on the number of gradations, $p_{max}$ has a different value. For example, when the number of gradations is 16, 32, and 64 (all of which include 0 as the minimum gradation), $p_{max}$ is 15, 31, and 63, respectively. In addition, when the minimum gradation does not include 0, it goes without saying that $p_{max}$ is 16, 32, 64, or 256, etc., depending on the number of gradations.

Further, when the alignment state is expressed as a percentage such as n %, the function g(n) can also be defined as in equation (3).

$$g(n) = a \left( \frac{n}{100} \right)^b + c \quad (3)$$

As described above, the light distribution angle corresponds to the half width at half maximum. Hereinafter, in order to unify the reference names, the term of the half width at half maximum is used for explanation. That is, f(x) and g(p) are both equations for calculating the half width at half maximum. Therefore, when the function f(x) is equal to the function g(p), that is, f(x)=g(p), the voltage x with respect to the gradation level p can be calculated. In addition, the constant c corresponds to the half width at half maximum when the gradation level is 0. That is, the constant c can be calculated from the half width at half maximum when the voltage x=0 V. Further, when the half width at half maximum $A_{max}$ at the maximum gradation level $p_{max}$ and the maximum voltage $x_{max}$ is used, the half width $A_{max}$ can be expressed as $A_{max} = a(p_{max}/255)^b + c$. Therefore, when the weighting coefficient b is determined, the constant a can be calculated.

As can be seen from equation (2), the weighting coefficient b is a value that determines the ratio of the amount of change in the half width at half maximum with respect to the amount of change in the gradation level p. When the weighting coefficient b is large, the amount of change in the light distribution angle at the lower gradation level p becomes small, and the amount of change in the light distribution angle at the higher gradation level p becomes large. In other words, when the weighting coefficient b is large, the number of gradations on the lower gradation increases. Therefore, in this case, fine adjustment at a small half width at half maximum becomes easy. In the lighting system 1, when the lighting mode is a narrow angle lighting mode, it is often used at a small light distribution angle rather than a large light distribution angle. In this case, it is preferable that the weighting coefficient b is large. In this way, the weighting coefficient b can be changed according to the application (lighting mode) used in the lighting system 1. Therefore, the storage section 340 includes a plurality of weighting coefficients 341 corresponding to a plurality of lighting modes. In addition, the weighting coefficient b is not limited to a natural number.

Figure 9:
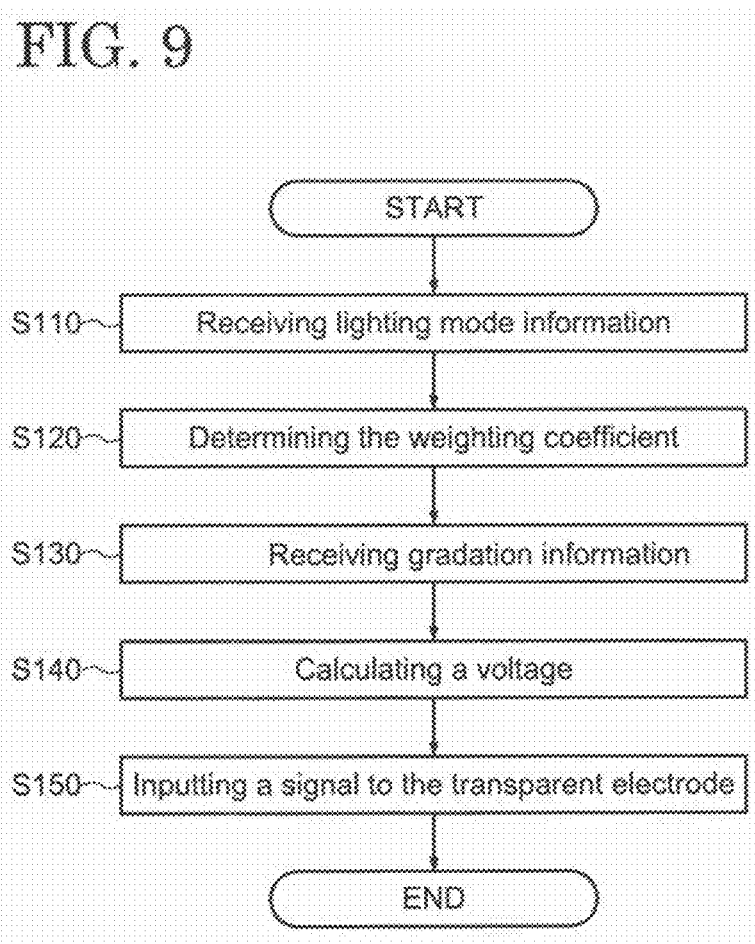
FIG. 9 is a flowchart illustrating gradation control processing in a lighting system according to an embodiment of the present invention.

FIG. 9 is a flowchart illustrating gradation control processing in the lighting system 1 according to an embodiment of the present invention. Although the flowchart shown in FIG. 9 includes steps S110 to S150, the gradation control processing may further include other steps.

In step S110, the communication portion 310 receives lighting mode information transmitted from the information communication terminal 40. The lighting mode information is one piece of user input information, and is generated when the user operates the input unit 430 of the information communication terminal 40.

In step S120, the optical element control section 330 determines the weighting coefficient b based on the lighting mode information. Specifically, the optical element control section 330 determines the weighting coefficient b corresponding to the lighting mode information from the plurality of weighting coefficients 341 stored in the storage section 340.

In step S130, the communication portion 310 receives gradation information transmitted from the information communication terminal 40. The gradation information is one piece of the user input information, and is generated when the user operates the input unit 430 of the information communication terminal 40.

In step S140, the optical element control section 330 calculates a voltage to be applied to the transparent electrode 120 based on gradation information. Specifically, the optical element control section 330 determines a gradation level p based on the gradation information. Further, the optical element control section 330 calculates a voltage x from the determined gradation level p and the relational equation f(x)=g(p).

In step S150, the optical element control section 330 inputs a signal including the calculated voltage x to the transparent electrode 120 of the liquid crystal cell 100.

As described above, in the lighting system 1, the optical element control section 330 can calculate the voltages to be input to the first transparent electrode 120-1 to the fourth transparent electrode 120-4 of each of the first liquid crystal cell 100-1 to the fourth liquid crystal cell 100-4 based on the gradation information and the weighting coefficient b.

[6. Difference in Gradation Due to Difference in Weighting Coefficient b]

[6-1. In the Case of Weighting Coefficient b=1]

Figure 10A:
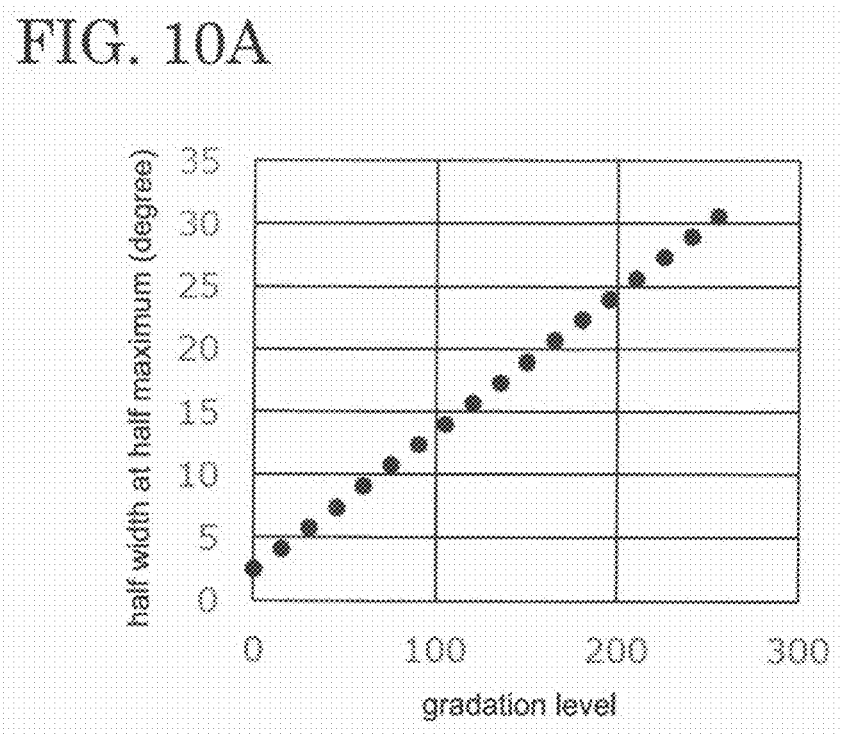
FIG. 10A is a graph showing a correlation between a gradation level and a half width at half maximum when a weighting coefficient b=1 in a lighting system according to an embodiment of the present invention.

FIG. 10A is a graph showing the correlation between a gradation level and a half width at half maximum when the weighting coefficient b=1 in the lighting system 1 according to an embodiment of the present invention. Further, FIG. 10B is a graph showing the correlation between the gradation level and a voltage applied to the transparent electrode 120 when the weighting coefficient b=1 in the lighting system 1 according to an embodiment of the present invention.

FIG. 10A shows a graph of g(p)=ap+c with the weighting coefficient b=1 in equation (2). As can be seen from the graph shown in FIG. 10A, the amount of change in the half width at half maximum with respect to the amount of change in the gradation level p is constant. However, the amount of change in the area of the light distribution shape on the projection surface is not constant. For example, when the gradation level is changed from 15 to gradation level 30, the amount of change in the half width at half maximum is 1.65 degrees, and the area change rate of the light distribution shape is 1.95%. On the other hand, when the gradation level is changed from 240 to gradation level 255, the amount of change in the half width at half maximum is 1.65 degrees, but the area change rate of the light distribution shape is 1.14%. That is, in comparison based on the area change rate of the light distribution shape, the change is larger at lower gradation levels than at higher gradation levels. This means that the amount of increase in area at lower gradation levels is larger than the amount of increase in area at higher gradation levels. Therefore, the user is more likely to perceive the spread of illumination at lower gradation levels than at higher gradation levels.

Figure 10B:
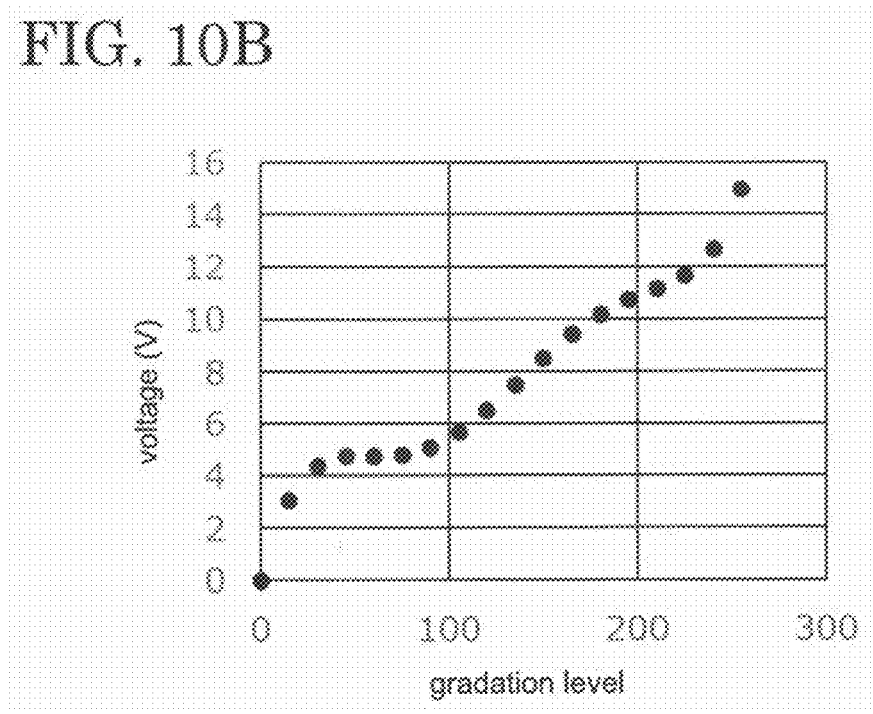
FIG. 10B is a graph showing a correlation between a gradation level and a voltage applied to a transparent electrode when a weighting coefficient b=1 in a lighting system according to an embodiment of the present invention.

FIG. 10B shows a graph in which a relational equation indicates the correlation between the gradation level p calculated as f(x)=g(p) and the voltage x when the weighting coefficient b=1. In the lighting system 1, the optical element control section 330 can convert the gradation level p into the voltage x based on the relational equation shown in FIG. 10B.

[6-2. In the Case of Weighting Coefficient b=2]

Figure 11A:
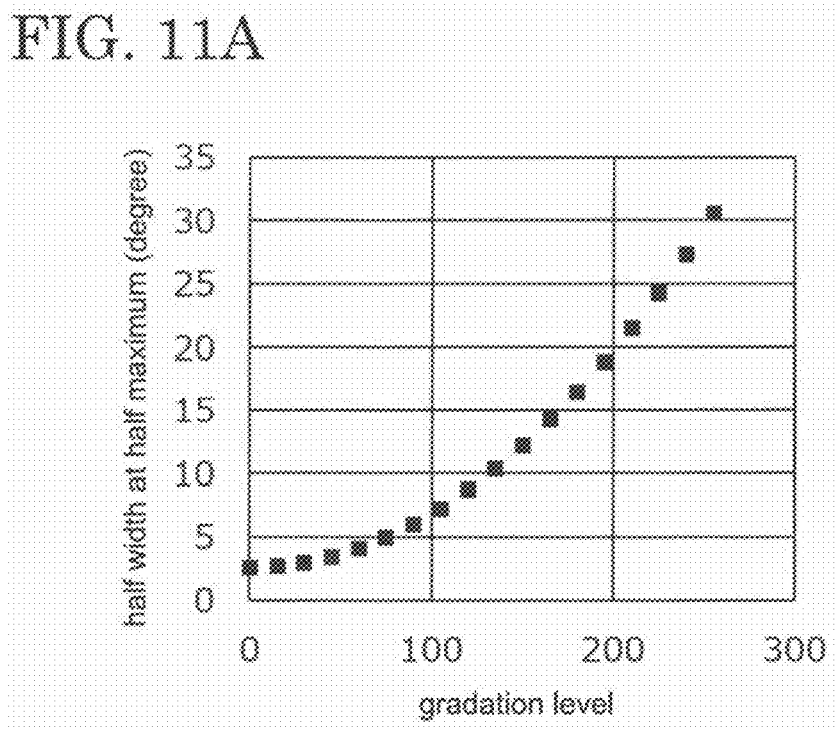
FIG. 11A is a graph showing a correlation between a gradation level and a half width at half maximum when a weighting coefficient b=2 in a lighting system according to an embodiment of the present invention.

FIG. 11A is a graph showing the correlation between a gradation level and a half width at half maximum when the weighting coefficient b=2 in the lighting system 1 according to an embodiment of the present invention. Further, FIG. 11B is a graph showing the correlation between the gradation level and a voltage applied to the transparent electrode 120 when the weighting coefficient b=2 in the lighting system 1 according to an embodiment of the present invention.

FIG. 11A shows a graph of g(p)=ap²+c with the weighting coefficient b=2 in equation (2). As can be seen from the graph shown in FIG. 11A, the amount of change in the half width at half maximum with respect to the amount of change in the gradation level p is not constant. The amount of change in the half width at half maximum is larger at higher gradation levels than at lower gradation levels. However, the amount of change in the area of the light distribution shape on the projection surface is not as large as the amount of change in the half width at half maximum. For example, when the gradation level changes from 15 to gradation level 30, the amount of increase in the half width at half maximum is 0.292 degrees, and the area increase rate of the light distribution shape is 1.23%. On the other hand, when the gradation level changes from 240 to gradation level 255, the amount of increase in the half width at half maximum is 3.106 degrees, while the area increase rate of the light distribution shape is 1.30%. The area increase rate of the light distribution shape is substantially the same at lower gradation levels and higher gradation levels. Therefore, the user can perceive the illumination spread to the same degree at both the lower gradation levels and the higher gradation levels.

Figure 11B:
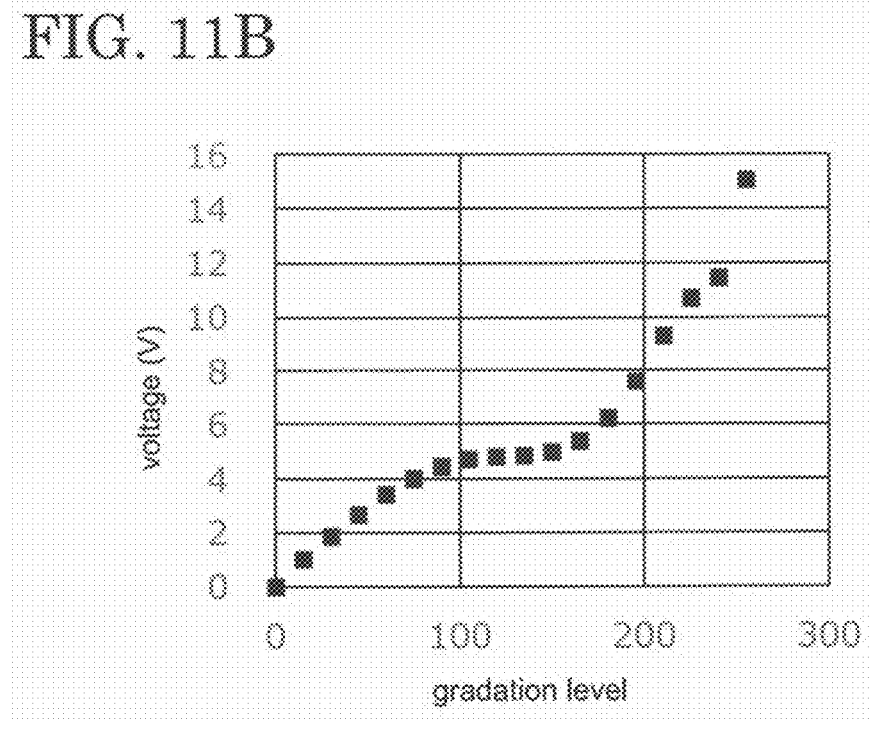
FIG. 11B is a graph showing a correlation between a gradation level and a voltage applied to a transparent electrode when a weighting coefficient b=2 in a lighting system according to an embodiment of the present invention.

FIG. 11B shows a graph in which a relational equation indicates the correlation between the gradation level p calculated as f(x)=g(x) and the voltage x when the weighting coefficient b=2. In the lighting system 1, the optical element control section 330 can convert the gradation level p into the voltage x based on the relational equation shown in FIG. 11B.

[6-3. In the Case of Weighting Coefficient b=3]

FIG. 12A is a graph showing the correlation between a gradation level and a half width at half maximum when the weighting coefficient b=3 in the lighting system 1 according to an embodiment of the present invention. Further, FIG. 12B is a graph showing the correlation between the gradation level and a voltage applied to the transparent electrode 120 when the weighting coefficient b=3 in the lighting system 1 according to an embodiment of the present invention.

FIG. 11A shows a graph of g(p)=ap³+c with the weighting coefficient b=3 in equation (2). As can be seen from the graph in FIG. 12A, the amount of change in the half width at half maximum with respect to the amount of change in the gradation level p is not constant. In the comparison with b=2, when b=3, the change in the half width at half maximum at lower gradation levels is small, and the change in the half width at higher gradation levels is large. Therefore, the user can adjust the slight spread of the illumination at lower gradation levels.

FIG. 12B shows a graph in which a relational equation indicates the correlation between the gradation level p calculated as f(x)=g(p) and the voltage x when the weighting coefficient b=3. In the lighting system 1, the optical element control section 330 can convert the gradation level p into the voltage x based on the relational equation shown in FIG. 12B.

As the correlations between the gradation level p and the half-width at half maximum are described in the case of the weighting coefficient b is 1, 2, and 3, the number of gradations at a small half width at half maximum can be increased when the weighting coefficient b increases. For example, when the lighting mode is a narrow-angle lighting mode such as a spotlight, a large half width at half maximum is not required, and fine adjustment at a small half width at half maximum may be required. In this case, by setting the weighting coefficient b to, for example, 3, and converting the gradation level p to the voltage x, the number of gradations at a small half-width at half maximum increases, making it possible to fine-adjust the gradation of the light distribution.

As described above, equation (2) is introduced and the optical element control section 330 calculates the voltage x to be applied to the transparent electrode 120 in the lighting system 1 according to the present embodiment. In this way, the gradation can be controlled based on the calculated voltage x so that the light distribution angle monotonically increases (or monotonically decreases). That is, the lighting system 1 can easily control the gradation of the light distribution. Further, since equation (2) includes the weighting coefficient b, it is possible to control the gradation of the light distribution by changing the weighting coefficient b according to the purpose (lighting mode) used by the user.

Therefore, in the lighting system 1, the gradation of the light distribution can be controlled according to the lighting mode.

Second Embodiment

A lighting system 1A according to an embodiment of the present invention is described with reference to FIG. 13. In the following description, when a configuration of the lighting system 1A is similar to the configuration of the lighting system 1, the description of the configuration of the lighting system 1A may be omitted.

FIG. 13 is a block diagram illustrating the lighting system 1A according to an embodiment of the present invention. The control device 30 includes the communication portion 310, the light source control section 320, an optical element control section 330A, and the storage section 340. The storage section 340 stores the plurality of weighting coefficients 341 corresponding to the plurality of lighting modes. The storage section 340 further stores a plurality of lookup tables (LUTs) 342A corresponding to the plurality of weighting coefficients 341.

In the lookup tables 342A, the voltages x of the first transparent electrode 120-1 to the fourth transparent electrode 120-4 of each of the first liquid crystal cell 100-1 to the fourth liquid crystal cell 100-4 at each gradation level p, which are calculated from equations (1) and (2), are assigned. That is, in the lookup tables 342A, the gradation level of the light distribution angle, the weighting coefficient, and the voltages x of the first transparent electrode 120-1 to the fourth transparent electrode 120-4 of each of the first liquid crystal cell 100-1 to the fourth liquid crystal cell 100-4 are associated with each other.

The optical element control section 330A can generate signals for controlling the optical element 10 and input the generated signals to the first liquid crystal cell 100-1 to the fourth liquid crystal cell 100-4, thereby making it possible to control the shape and gradation of the light distribution.

Specifically, the optical element control section 330A determines the weighting coefficient b corresponding to the lighting mode information from the plurality of weighting coefficients 341 stored in the storage section 340, based on the lighting mode information transmitted from the information communication terminal 40. The optical element control section 330A determines the gradation level based on the gradation information transmitted from the information communication terminal 40. The optical element control section 330A acquires a lookup table corresponding to the weighting coefficient b from the plurality of lookup tables 342A stored in the storage section 340. The optical element control section 330A acquires the voltages of the first transparent electrodes 120-1 to the fourth transparent electrodes 120-4 of the first liquid crystal cell 100-1 to the fourth liquid crystal cell 100-4, which correspond to the gradation level, based on the acquired lookup table. The optical element control section 330A inputs signals including the acquired voltages to the first transparent electrode 120-1 to the fourth transparent electrode 120-4 of each of the first liquid crystal cell 100-1 to the fourth liquid crystal cell 100-4. As a result, the light emitted from the light source 20 is controlled to have a light distribution having a gradation desired by the user.

As described above, the plurality of lookup tables 342A are stored in the lighting system 1A according to the present embodiment. When the optical element control section 330A acquires a predetermined lookup table, the gradation can be controlled so that the light distribution angle increases (or decreases) based on the acquired lookup table. That is, the lighting system 1A facilitates the gradation control of the light distribution. Further, since equation (2) includes the weighting coefficient b, it is possible to control the gradation of the light distribution by changing the weighting coefficient b according to the purpose (lighting mode) used by the user. Therefore, in the lighting system 1A, the gradation of the light distribution can be controlled according to the lighting mode.

Third Embodiment

A lighting system 1B according to an embodiment of the present invention is described with reference to FIG. 14. In the following, when a configuration of the lighting system 1B is similar to the configuration of the lighting system 1, the description of the configuration of the lighting system 1B may be omitted.

FIG. 14 is a block diagram illustrating the lighting system 1B according to an embodiment of the present invention. The control device 30 includes the communication portion 310, the light source control section 320, and an optical element control section 330B. The information communication terminal 40 includes the communication portion 410, the display portion 420, the input portion 430, a calculation section 440B, and a storage section 450B. The storage section 450B stores weighting coefficients 451B corresponding to the plurality of lighting modes.

The calculation section 440B is, for example, a computer. The calculation section 440B can generate gradation data necessary for controlling the optical element 10. Specifically, the calculation section 440B determines the weighting coefficient b corresponding to the lighting mode information from the plurality of weighting coefficients 451B stored in the storage section 450B based on the lighting mode information generated by the input portion 430. The calculation section 440B determines a gradation level based on the gradation information generated by the input portion 430. The calculation section 440B calculates a voltage to be applied to the transparent electrode 120 from the determined gradation level and the relational equation $f(x)=g(x)$. The voltage is calculated for all of the first transparent electrode 120-1 to the fourth transparent electrode 120-4 of each of the first liquid crystal cell 100-1 to the fourth liquid crystal cell 100-4. The gradation data including the calculated voltage is transmitted to the control device 30 via the communication portion 410.

The optical element control section 330B can generate signals for controlling the optical element 10 based on the transmitted gradation data and input the generated signals to the first liquid crystal cell 100-1 to the fourth liquid crystal cell 100-4. As a result, the shape and gradation of the light distribution can be controlled.

As described above, a program is installed in the user's information communication terminal 40 in the lighting system 1B according to the present embodiment, and the calculation section 440B calculates the voltage x to be applied to the transparent electrode 120 using equation (2). The calculated voltage x is transmitted to the control device 30, and the optical element control section 330B can control the gradation so that the light distribution angle monotonically increases (or monotonically decreases) based on the transmitted voltage x. That is, the lighting system 1B facilitates the gradation control of the light distribution.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by each embodiment, but which are apparent from the description herein or which can be readily predicted by those skilled in the art, are naturally understood to be brought about by the present invention.

What is claimed is:

1. A lighting system, comprising:

a light source;

a liquid crystal cell for changing a light distribution angle of light emitted from the light source; and a control device for controlling a gradation of the light distribution angle, wherein the liquid crystal cell comprises:

a first substrate on which a first transparent electrode and a second transparent electrode each extending in a first direction are alternately provided, a second substrate on which a third transparent and a fourth transparent electrode each extending in a second direction orthogonal to the first direction are alternately provided, and a liquid crystal layer between the first substrate and the second substrate, and wherein the control device comprises:

a communication portion for receiving gradation information of the light distribution angle from an information communication terminal;

a storage section for storing a weighting coefficient that associates a change in the light distribution angle with a change in the gradation of the light distribution angle, and a control section for calculating a first voltage to be input to the first transparent electrode, a second voltage to be input to the second transparent electrode, a third voltage to be input to the third transparent electrode, and a fourth voltage to be input to the fourth transparent electrode based on the gradation information and the weighting coefficient.

2. The lighting system according to claim 1, wherein the lighting system comprises a plurality of lighting modes, and wherein the storage section comprises the weighting coefficient corresponding to each of the plurality of lighting modes.

3. The lighting system according to claim 1, wherein the storage section comprises a lookup table in which gradation levels of the light distribution angle, the weighting coefficient, the first voltage, the second voltage, and the fourth voltage are associated with each other.

4. The lighting system according to claim 3, wherein the lighting system comprises a plurality of lighting modes, and wherein the storage section comprises the lookup table corresponding to the weighting coefficient in each of the plurality of lighting modes.

5. The lighting system according to claim 3, wherein a first function f(x) represents a correlation between a voltage x and a light distribution angle f calculated based on measurement data, wherein a second function $g(p)=a(p/p_{max})^b+c$ converts a gradation level p into a light distribution angle g (where a and c are arbitrary constants, b is the weighting coefficient, and $p_{max}$ is a maximum value in gradation levels), and wherein the lookup table associates the voltage x corresponding to the gradation level p on the basis that the light distribution angle g determined from the second function g(x) matches a light distribution angle f of the first function (g(p)=f(x)).

6. The lighting system according to claim 5, wherein the weighting coefficient b is greater than or equal to 1.

* * * * *